(12) United States Patent
Chen

(10) Patent No.: US 8,482,948 B2
(45) Date of Patent: Jul. 9, 2013

(54) INTERLEAVE CONTROL POWER SUPPLY DEVICE AND CONTROL CIRCUIT

(75) Inventor: Jian Chen, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 934 days.

(21) Appl. No.: 12/588,242

(22) Filed: Oct. 8, 2009

(65) Prior Publication Data

US 2010/0097828 A1 Apr. 22, 2010

(30) Foreign Application Priority Data

Oct. 16, 2008 (JP) ................................. 2008-267600
Jun. 9, 2009 (JP) ................................. 2009-138578

(51) Int. Cl.
*H02J 1/00* (2006.01)

(52) U.S. Cl.
USPC ................ 363/72; 363/81; 363/82; 363/87

(58) Field of Classification Search
USPC ......... 363/65, 69, 71, 72, 81, 82, 87; 323/272
See application file for complete search history.

(56) References Cited

U.S. PATENT DOCUMENTS

| 5,079,686 A * | 1/1992 | Vinciarelli ..................... 363/15 |
| 5,905,369 A | 5/1999 | Ishii et al. |
| 6,690,589 B2 * | 2/2004 | Barnett et al. .................. 363/72 |
| 2007/0253223 A1 | 11/2007 | Neidorff et al. |
| 2007/0253224 A1 | 11/2007 | Cohen et al. |

* cited by examiner

*Primary Examiner* — Adolf Berhane
*Assistant Examiner* — Yemane Mehari
(74) *Attorney, Agent, or Firm* — Manabu Kanesaka

(57) ABSTRACT

A two-phase critical interleave PFC boost converter, includes a master-side control circuit configured to critically control a first switching element based on a master signal; and a slave-side control circuit configured to critically control a second switching element based on a slave-signal with a phase difference of 180° from the master signal. In the PFC boost converter, an off period generator of the master-side control circuit feeds an M_ON signal which is the same in waveform as the master signal to an on phase controller of the slave-side control circuit, and the slave-side control circuit determines the rising timing of the slave signal from the rising time of the master signal.

17 Claims, 18 Drawing Sheets

INTERLEAVE CONTROL POWER SUPPLY DEVICE AND CONTROL CIRCUIT

BACKGROUND OF THE INVENTION AND RELATED ART STATEMENT

The present invention relates to an interleave control power supply device for performing power factor correction (PFC) and a control circuit. Particularly, it relates to a switching power supply device which converts an AC power supply as an input into a DC output with a high power factor by using an interleaved switching control technique.

It is well-known that AC power includes active power, reactive power and apparent power, but active power is the only power which can be converted for AC/DC conversion. Accordingly, more power can be converted into DC as the power factor is larger (close to 100%). It is therefore general that attention is paid to PFC (Power Factor Correction) when an efficient switching power supply device must be designed. In addition, PFC as a harmonic reducing circuit has become important with the advance of restrictions on harmonics in recent years.

There has been heretofore known a PFC boost converter for controlling a stable output voltage while generating an input current proportional to an input voltage by using a boost circuit. As control modes for controlling switching elements in such a PFC boost converter, there are known a (current) discontinuous mode, a (current) continuous mode and a critical mode separated by a current flowing in an inductor.

A critical single mode and a critical interleave mode have been known as the critical mode. Generally, in an interleave control technique, the phase difference between two converter circuits (a master and a slave) must be 180° to suppress ripples of an output voltage and an output current and a peak value of output power. A critical interleave control technique for performing digital controlling has been disclosed in US Patent Application Publication No. 2007/2532323. A critical interleave control technique for performing analog controlling has been disclosed in US Patent Application Publication No. 2007/2532324, JP-A-10-127049 and JP-A-10-146049.

The digital technique disclosed in US Patent Application Publication No. 2007/2532323 is a technique which measures a switching cycle based on a clock cycle to obtain a phase difference of 180°, that is, a half cycle. In order to keep sufficient accuracy, the clock cycle needs to be sufficiently smaller than the switching cycle. In order to achieve this condition, it is necessary to increase the number of digital bits. For this reason, the problem of increase in circuit scales occurs.

The analog technique disclosed in US Patent Application Publication No. 2007/2532324 requires independent switching control circuits for respective phases. This causes a problem that a long delay is required before the phase difference between respective phases reaches a predetermined phase difference. Moreover, a phase difference detecting circuit is so complex that phase control accuracy is lowered. This causes a problem of increase in circuit scale. Specifically, in a circuit shown in FIG. 4 in US Patent Application Publication No. 2007/2532324, a phase difference holding circuit 390 is provided for holding a phase difference of 180° between two converter circuits 392 and 394. There is a problem that a long time is required before the phase difference holding circuit 390 completes the phase difference control.

In the analog technique disclosed in JP-A-10-127049 and JP-A-10-146049, the timing of a slave signal is determined by detecting the timing of crossing of voltages of two capacitors based on a master signal used as a reference in such a manner that one capacitor is charged while the other capacitor is discharged during one cycle of the master signal. This technique however requires a circuit for detecting the timing of crossing of voltages of two capacitors charged and/or discharged. The discharge-side capacitor needs to have a function of performing rapid discharging at the crossing timing. For this reason, there is a problem that a circuit for generating the slave signal becomes complex while phase control accuracy is low.

That is, in order to obtain a phase difference of 180° between the master and the slave as described above, a charging current and a discharging current and capacitance values of two capacitors need be accurately equalized to each other. Particularly as for capacitors, individual variations in capacitors are unavoidable if the two capacitors are made of discrete parts. Moreover, if an offset voltage exists in a comparator for comparing voltages of two capacitors, there is a problem that the offset voltage will directly cause error in phase difference.

With respect to the current, JP-A-10-127049 has still a problem that accuracy cannot be fully warranted because a current in a time constant circuit of CR is used. Incidentally, because a constant current source is used in FIG. 9 in JP-A-10-146049, it is conceived that current accuracy can be warranted.

To overcome the problems in the background art, an object of the invention is to provide an interleave control power supply device having an interleave control circuit of a simple analog interleave control technique that can achieve high phase control accuracy and small circuit scale, and a control circuit and method for the power supply device.

Further objects and advantages of the invention will be apparent from the following description of the invention.

SUMMARY OF THE INVENTION

The invention provides an interleave control power supply device including a master converter, and a slave converter, for operating a switching element of the master converter and a switching element of the slave converter with a predetermined phase difference, wherein:

the master converter has a master-side control circuit for controlling the switching element;

the master-side control circuit generates a master signal for controlling the on/off state of the switching element, and controls the switching element at the on and off timing of the master signal;

the slave converter has a slave-side control circuit for controlling the switching element; and the slave-side control circuit:

(a) has an on phase controller which receives the on timing of the master signal, generates an on timing signal of the slave signal with a predetermined phase difference from the master signal based on the on timing of the master signal and outputs the on timing signal as a timing signal for turning on the switching element of the slave converter, and a slave-side on period generator which generates an on period of the switching element of the slave converter; or (b) has the on phase controller, and an off phase controller which receives the off timing of the master signal, generates an off timing signal of the slave signal with a predetermined phase difference from the master signal based on the off timing of the master signal and outputs the off timing signal as a timing signal for turning off the switching element of the slave converter; or (c) has the off phase controller, and a slave-side off period generator which generates an off period of the switching element of the slave converter.

In the invention, the master-side control circuit has:

a master-side on period generator which generates an on period of the switching element by multiplying a difference between an error signal output from an error amplifier and a reference voltage by a constant coefficient or generates an on period with a fixed width;

a master-side off period generator which generates an off period of the switching element of the master converter by applying an arithmetic operation of off period=input voltage× on period/(output voltage−input voltage) based on an input voltage, an output voltage and the on period generated by the master-side on period generator, and outputs a timing signal for turning on the switching element of the master converter based on the off period or by detecting the time that a current flowing in an inductor of the master converter becomes zero;

the slave-side control circuit has:

a slave-side on period generator which generates an on period of the switching element of the slave converter by multiplying a difference between the error signal output from the error amplifier and a reference voltage by a constant coefficient; and a slave-side off period generator which generates an off period of the switching element of the slave converter;

the slave-side off period generator generates an off period of the switching element of the slave converter by an arithmetic operation of input voltage×on period/(output voltage−input voltage) based on the input voltage, the output voltage and the on period generated by the master-side on period generator or the slave-side on period generator, and outputs a timing signal for turning on the switching element of the slave converter based on the off period; or the slave-side off period generator detects a current flowing in an inductor of the slave converter to thereby detect the time that the current flowing in the inductor of the slave converter becomes zero, and outputs a timing signal for turning on the switching element of the slave converter.

In the invention, the on phase controller has:

a master signal cycle information generating circuit which has a first capacitor and which charges or discharges the first capacitor during one period of the master signal;

a first timing determination circuit which determines the first timing of the slave signal based on completion of discharging or charging of the first capacitor; and a second timing determination circuit which has a second capacitor and which determines the second timing of the slave signal based on discharging or charging of the second capacitor during charging or discharging of the first capacitor by making the second capacitor perform the same operation as the first capacitor while shifting one period from the master signal period used for charging of the first capacitor by the master signal cycle information generating circuit.

In this case, there is preferably provided a slave signal generating circuit which generates an on timing signal of the slave signal by ORing the first timing determined by the first timing determination circuit and the second timing determined by the second timing determination circuit.

In the invention, the off phase controller has:

a master signal cycle information generating circuit which has a first capacitor and which charges or discharges the first capacitor during one period of the master signal;

a first timing determination circuit which determines the first timing of the slave signal based on completion of discharging or charging of the first capacitor; and a second timing determination circuit which has a second capacitor and which determines the second timing of the slave signal based on discharging or charging of the second capacitor during charging or discharging of the first capacitor by the master signal cycle information generating circuit by making the second capacitor perform the same operation as the first capacitor while shifting one period from the master signal period used for charging of the first capacitor by the master signal cycle information generating circuit.

In this case, there is preferably provided a slave signal generating circuit which generates an off timing signal of the slave signal by ORing the first timing determined by the first timing determination circuit and the second timing determined by the second timing determination circuit.

In the invention, each of the on phase controller and the off phase controller has:

a master signal cycle information generating circuit which has a first capacitor and which charges or discharges the first capacitor during one period of the master signal;

a first timing determination circuit which determines the first timing of the slave signal based on completion of discharging or charging of the first capacitor; and a second timing determination circuit which has a second capacitor and which determines the second timing of the slave signal based on discharging or charging of the second capacitor during charging or discharging of the first capacitor by making the second capacitor perform the same operation as the first capacitor while shifting one period from the master signal period used for charging or discharging of the first capacitor by the master signal cycle information generating circuit;

the slave-side control circuit further has a first logic circuit which generates a first on/off signal from the first timing determined by the on phase controller and the first timing determined by the off phase controller, a second logic circuit which generates a second on/off signal from the second timing determined by the on phase controller and the second timing determined by the off phase controller, and a third logic circuit which generates the slave signal by combining the first on/off signal and the second on/off signal; or the slave-side control circuit further has a fourth logic circuit which generates an on timing signal of the slave signal from the first timing determined by the on phase controller and the second timing determined by the second timing determination circuit, a fifth logic circuit which generates an off timing signal of the slave signal from the first timing determined by the on phase controller and the second timing determined by the second timing determination circuit, and a sixth logic circuit which generates the slave signal by combining the on timing signal of the slave signal and the off timing signal of the slave signal.

In the above description, the master signal cycle information generating circuit has a capacitor charging circuit which generates cycle information of the master signal by charging the first capacitor at a predetermined charging current with a predetermined constant voltage as an initial value during one period of the master signal;

the capacitor charging circuit has a constant current source which controls the predetermined charging current, and a first switch circuit which puts the constant current source in a charging path of the first capacitor;

the first timing determination circuit has a capacitor discharging circuit which determines the first timing signal by discharging the first capacitor at a predetermined discharging current from the charged voltage charged during one period of the master signal to the predetermined constant voltage; and the capacitor discharging circuit has a constant current source which controls the predetermined discharging current, and a second switch circuit which puts the constant current source in a discharging path of the capacitor.

In the above description, the master signal cycle information generating circuit has a capacitor discharging circuit which generates cycle information of the master signal by discharging the first capacitor at a predetermined discharging current with a predetermined constant voltage as an initial value during one period of the master signal;

the capacitor discharging circuit has a constant current source which controls the predetermined discharging current, and a first switch circuit which puts the constant current source in a discharging path of the first capacitor;

the first timing determination circuit has a capacitor charging circuit which determines the first timing signal by charging the first capacitor at a predetermined charging current from the discharged voltage discharged during one period of the master signal to the predetermined constant voltage;

the capacitor charging circuit has a constant current source which controls the predetermined charging current, and a second switch circuit which puts the constant current source in a charging path of the capacitor.

In the interleave control power supply device according to the invention, the ratio of the value of the discharging current to the value of the charging current in each of the first and second capacitors is set at a predetermined value to thereby generate a predetermined phase difference.

The invention provides a multi-phase interleave control power supply device including:

the master-side control circuit;

N−1 slave-side control circuits each having the same configuration as the aforementioned slave-side control circuit; wherein:

when the first capacitor is charged during one period of the master signal in the k-phase order slave-side control circuit, $$Id\_k=(N/k) \cdot Ic$$

in which k is an integer of 1 to (N−1) in which N is an integer of 3 or larger, $Id\_k$ is a discharging current of the k-phase order capacitor, and Ic is a charging current; and when the first capacitor is discharged during one period of the master signal, $$Ic\_k=(N/k) \cdot Id$$

In which Id is a discharging current of the k-phase order capacitor, and $Ic\_k$ is a charging current.

A control circuit of an interleave control power supply device according to the invention is a control circuit of an interleave control power supply device having a master converter, and a slave converter, for operating a switching element of the master converter and a switching element of the slave converter with a predetermined phase difference, the control circuit having:

a master-side control circuit which generates a master signal for controlling the on/off state of the switching element of the master converter and controls the switching element at the on and off timing of the master signal; and a slave-side control circuit which controls the switching element of the slave converter; wherein:

the slave-side control circuit (a) has an on phase controller which receives the on timing of the master signal, generates an on timing signal of the slave signal with a predetermined phase difference from the master signal based on the on timing of the master signal and outputs the on timing signal as a timing signal for turning on the switching element of the slave converter, and a slave-side on period generator which generates an on period of the switching element of the slave converter; or (b) has the on phase controller, and an off phase controller which receives the off timing of the master signal, generates an off timing signal of the slave signal with a predetermined phase difference from the master signal based on the off timing of the master signal and outputs the off timing signal as a timing signal for turning off the switching element of the slave converter; or (c) has the off phase controller, and a slave-side off period generator which generates an off period of the switching element of the slave converter.

In the above description, the master-side control circuit has:

a master-side on period generator which generates an on period of the switching element of the master converter by multiplying a difference between an error signal output from an error amplifier and a reference voltage by a constant coefficient or generates an on period with a fixed width;

a master-side off period generator which generates an off period of the switching element of the master converter by applying an arithmetic operation of off period=input voltage× on period/(output voltage−input voltage) based on an input voltage, an output voltage and the on period generated by the master-side on period generator, and outputs a timing signal for turning on the switching element of the master converter based on the off period or by detecting a current flowing in an inductor of the master converter, that is, by detecting the time that the current flowing in the inductor of the master converter becomes zero;

the slave-side control circuit has:

a slave-side on period generator which generates an on period of the switching element of the slave converter by multiplying a difference between the error signal output from the error amplifier and a reference voltage by a constant coefficient or generates an on period with a fixed width; and a slave-side off period generator which generates an off period of the switching element of the slave converter;

the slave-side off period generator generates an off period of the switching element of the slave converter by an arithmetic operation of input voltage×on period/(output voltage− input voltage) based on the input voltage, the output voltage and the on period generated by the master-side on period generator or the slave-side on period generator, and outputs a timing signal for turning on the switching element of the slave converter based on the off period; or the slave-side off period generator detects a current flowing in an inductor of the slave converter to thereby detect the time that the current flowing in the inductor of the slave converter becomes zero, and outputs a timing signal for turning on the switching element of the slave converter.

In the above description, the on phase controller has:

a master signal cycle information generating circuit which has a first capacitor and which charges or discharges the first capacitor during one period of the master signal;

a first timing determination circuit which determines the first timing of the slave signal based on completion of discharging or charging of the first capacitor; and a second timing determination circuit which has a second capacitor and which determines the second timing of the slave signal based on discharging or charging of the second capacitor during charging or discharging of the first capacitor by the master signal cycle information generating circuit by making the second capacitor perform the same operation as the first capacitor while shifting one period from the master signal period used for charging the first capacitor by the master signal cycle information generating circuit.

The invention provides a method of controlling an interleave control power supply device, which is a method of controlling an interleave control power supply device having a master-side control circuit, and a slave-side control circuit, for operating a switching element of a master converter and a switching element of a slave converter with a predetermined phase difference, wherein:

the master-side control circuit generates a master signal for controlling the on/off state of the switching element of the master converter and controls the switching element at the on and off timing of the master signal; and the slave-side control circuit (a) receives the on timing of the master signal, generates an on timing signal of the slave signal with a predetermined phase difference from the master signal based on the on timing of the master signal and outputs the on timing signal as a timing signal for turning on the switching element of the slave converter while the slave-side control circuit generates an on period of the switching element of the slave converter; or (b) receives the on timing of the master signal, generates an on timing signal of the slave signal with a predetermined phase difference from the master signal based on the on timing of the master signal and outputs the on timing signal as a timing signal for turning on the switching element of the slave converter while the slave-side control circuit receives the off timing of the master signal, generates an off timing signal of the slave signal with a predetermined phase difference from the master signal based on the off timing of the master signal and outputs the off timing signal as a timing signal for turning off the switching element of the slave converter; or (c) receives the off timing of the master signal, generates an off timing signal of the slave signal with a predetermined phase difference from the master signal based on the off timing of the master signal and outputs the off timing signal as a timing signal for turning off the switching element of the slave converter while the slave-side control circuit generates an off period of the switching element of the slave converter.

In the above description, the master-side control circuit generates an on period of the switching element of the master converter by multiplying a difference between an error signal output from an error amplifier and a reference voltage by a constant coefficient or generates an on period with a fixed width while the master-side control circuit generates an off period of the switching element of the master converter by applying an arithmetic operation of off period=input voltage× on period/(output voltage−input voltage) based on an input voltage, an output voltage and the on period, and outputs a timing signal for turning on the switching element of the master converter based on the off period or by detecting a current flowing in an inductor of the master converter, that is, by detecting the time that the current flowing in the inductor of the master converter becomes zero;

the slave-side control circuit generates an on period of the switching element of the slave converter by multiplying a difference between the error signal output from the error amplifier and a reference voltage by a constant coefficient or generates an on period with a fixed width; and the slave-side control circuit generates an off period of the switching element of the slave converter by applying an arithmetic operation of input voltage×on period/(output voltage− input voltage) based on the input voltage, the output voltage and the on period generated on the master side or on the slave side and outputs a timing signal for turning on the switching element of the slave converter based on the off period, or the slave-side control circuit detects a current flowing in an inductor of the slave converter to thereby detect the time that the current flowing in the inductor of the slave converter becomes zero, and outputs a timing signal for turning on the switching element of the slave converter.

In the above description, the slave-side control circuit includes:

a process which has a first capacitor and which charges or discharges the first capacitor during one period of the master signal to thereby generate master signal cycle information;

a first timing determination process which determines the first timing of the slave signal based on completion of discharging or charging of the first capacitor; and a second timing determination process which has a second capacitor and which determines the second timing of the slave signal based on discharging or charging of the second capacitor during charging or discharging of the first capacitor by the master signal cycle information generating process by making the second capacitor perform the same operation as the first capacitor while shifting one period from the master signal period used for charging the first capacitor by the master signal cycle information generating process.

According to the invention, in two-phase critical interleave control, a signal with a phase difference of 180° is generated on the master side and fed to the slave side so that a necessary switching control signal is generated on the slave side. Accordingly, a power factor-improved power supply device in which phase control accuracy is kept high can be achieved by a simple configuration and an analog interleave control technique.

When the invention is applied to N-phase critical interleave control, a signal with a phase difference of 360°·(k/N) is generated on the master side and fed to the slave side so that a necessary switching control signal is generated on the slave side. Accordingly, a power factor-improved power supply device in which phase control accuracy is kept high can be achieved by a simple configuration and an analog interleave control technique. Incidentally, k is an integer of 1 to (N−1) in which N is an integer of 3 or larger.

The analog interleave control technique of the invention has no relation with variations in capacitance of capacitors and offset voltages of comparators though the background art technique has relation with such variations and offset voltages. Accordingly, phase control accuracy can be improved. Moreover, when a constant current source is used for a current, phase control accuracy can be prevented from being lowered.

DETAILED DESCRIPTION OF PREFERRED EMBODIMENTS

Embodiments of the invention will be described below in detail.

Embodiment 1

Figure 1:
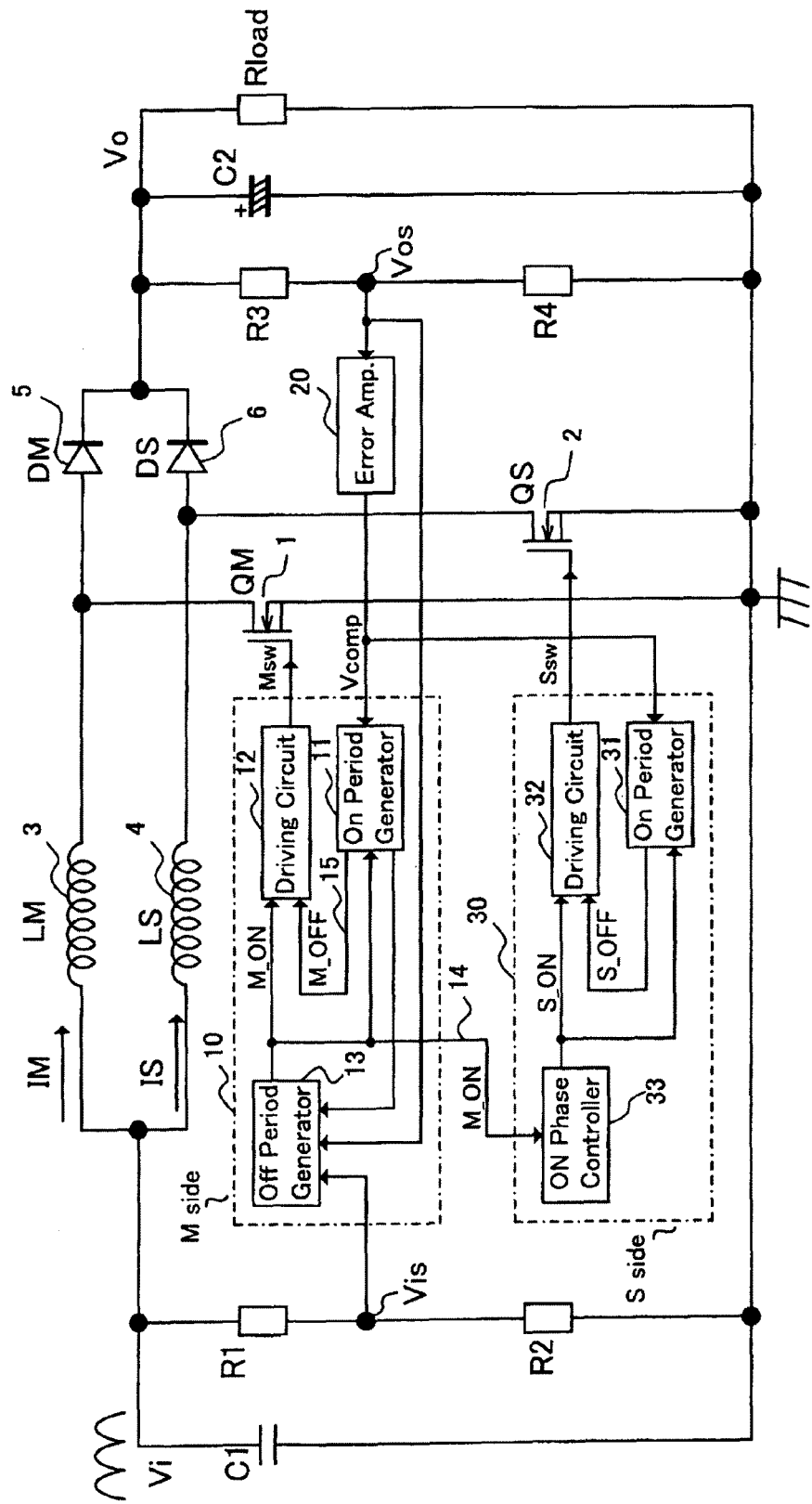
FIG. 1 is a diagram showing a circuit configuration of a two-phase critical interleaved PFC boost converter according to a first embodiment of the invention.
Figure 2:
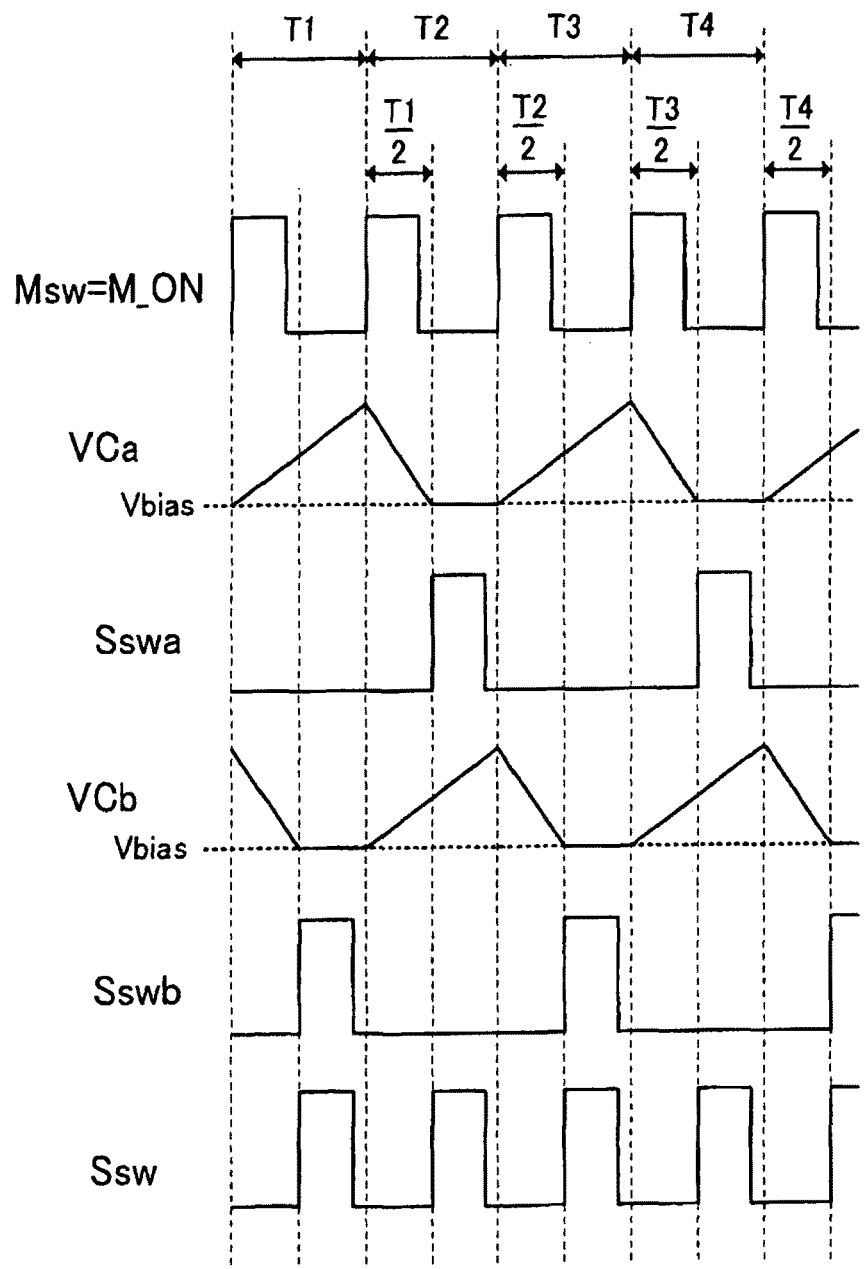
FIG. 2 is a time chart for explaining the operation of the two-phase critical interleaved PFC boost converter shown in FIG. 1.

FIG. 1 is a diagram showing a circuit configuration of a two-phase critical interleaved PFC (Power Factor Correction) boost converter according to a first embodiment of the invention. The two-phase critical interleaved PFC boost converter includes a capacitor C1 for removing high-frequency noise such as switching noise superposed on an input voltage Vi which is obtained by full-wave rectifying an AC power voltage, resistors R1 and R2 for generating a voltage Vis as a detection voltage of the input voltage Vi by dividing the input voltage Vi, a master-side switching element QM (1), an inductor LM (3), an anti-backflow diode DM (5), a slave-side switching element QS (2), an inductor LS (4), an anti-backflow diode DS (6), resistors R3 and R4 for generating a voltage Vos as a detection voltage of an output voltage Vo by dividing the output voltage Vo, a capacitor C2 for smoothing the output voltage Vo, a master-side control circuit 10 for driving the master-side switching element QM (1), and a slave-side control circuit 30 for driving the slave-side switching element QS (2). Rload is a load. FIG. 2 is a time chart for explaining operation of the two-phase critical interleaved PFC boost converter shown in FIG. 1. The time chart is for explaining a mechanism of determining the rising timing of a slave signal Ssw (a signal for controlling the on/off of the switching element QS (2)) with use of the rising timing of a master-side M_ON signal (14) as a reference. Incidentally, because a master signal Msw (a signal for controlling the on/off of the switching element QM (1)) and the M_ON signal (14) are the same in waveform, the rising timing of the master-side M_ON signal (14) is equal to the rising timing of the master signal Msw.

The circuit configuration shown in FIG. 1 is a circuit configuration of the two-phase critical interleaved PFC boost converter. The master-side control circuit 10 is configured to critically control the switching element QM (1) based on the master signal Msw. On the other hand, the slave-side control circuit 30 is configured to critically control the switching element QS (2) based on the slave signal Ssw with a phase difference of 180° from the master signal Msw.

Now, the configuration for critically controlling the switching element QM (1) based on the master signal Msw will be described. The critical point of a critical PFC boost converter, that is, the turn-on timing (end timing of off period Toff) of the switching element QM (1) is determined by application of a predetermined arithmetic operation based on the respective values of the on period of the switching element QM (1), the input voltage Vi and the output voltage Vo. Critical control is achieved based on the turn-on timing of the switching element QM (1).

Generally, in a boost converter, the frequency of the input voltage Vi and the ripple frequency of the output voltage Vo are at most 50 Hz-60 Hz and 100 Hz-120 Hz respectively. In most cases, about 100 kHz is used as the frequency of switching. Accordingly, because the switching frequency is about 1000 times as high as the ripple frequencies of the input voltage Vi and the output voltage Vo, the input voltage Vi and the output voltage Vo can be regarded as constant in one cycle of switching. If the input voltage Vi can be regarded as constant in one cycle of switching, a charging current $\Delta$Ion of the inductor LM in one cycle of switching can be given by the following equation (1):

$$\Delta Ion = Vi \cdot Ton / L \quad (1)$$

in which Ton is the on period of the switching element QM (1), and L is the inductance of the inductor LM as described above. If the output voltage Vo can be also regarded as constant, the discharging current $\Delta$Ioff of the inductor LM in one cycle of switching can be given by the following equation (2):

$$\Delta Ioff = (Vo - Vi) \cdot Toff / L \quad (2)$$

in which Toff is the off period of the switching element QM (1).

As described above, in a boost converter, it is known that an inductor current decreases at a slope of (Vo−Vi)/L when it decreases because there is a relation that the output voltage Vo is higher than the input voltage Vi.

In a critical operation, the charging current and the discharging current of the inductor LM become equal to each other. Accordingly, the relation between the off period Toff and the on period Ton of the switching element QM (1) can be given in accordance with the aforementioned equations (1) and (2) by the following equation (3):

$$Toff = Vi \cdot Ton / (Vo - Vi) \quad (3)$$

If the on period Ton of the switching element QM (1), the input voltage Vi and the output voltage Vo can be known, the off period Toff of the switching element QM (1) can be calculated from the equation (3). If the off period Toff of the switching element QM (1) can be known, a critical operation can be achieved in such a manner that the critical point is detected and the switching element is turned on at the detected critical point.

When the switching element QM (1) is switching-controlled by PWM (Pulse Width Modulation), the on period Ton of the switching element QM (1) can be regarded as being proportional to a COMP voltage (error signal) Vcomp which is an output of an error amplifier 20. Accordingly, the on period Ton of the switching element QM (1) can be given by the following equation (4). Incidentally, the COMP voltage (error signal) Vcomp as an output of the error amplifier 20 is a signal obtained by amplifying the difference between the detection voltage Vos of the output voltage Vo and a reference voltage Vofs (not shown).

$$Ton=(Vcomp-Vbias)k \qquad (4)$$

in which k and Vbias are constants. When the equation (4) is put into the equation (3), the off period Toff of the switching element QM (1) performing a critical operation can be given by the following equation (5) or (6):

$$Toff=Vi \cdot (Vcomp-Vbias)k/(Vo-Vi) \qquad (5)$$

$$Toff=Vis \cdot (Vcomp-Vbias)k/(Vos-Vis) \qquad (6)$$

As described above, when an on period generator 11 generates an on period Ton by using the COMP voltage Vcomp as an output of the error amplifier 20, the turn-off timing (end timing of the on period Ton) of the switching element QM (1) can be known from the equation (4) so that the M_OFF signal is input to a driving circuit 12 at the turn-off timing.

On the other hand, the on period Ton may be fixed by PFM (Pulse Frequency Modulation) control.

When an off period generator 13 generates an off period Toff by using the voltage Vis as the detection voltage of the input voltage Vi, the voltage Vos as the detection voltage of the output voltage Vo and the on period Ton of the switching element QM (1) generated by the on period generator 11, the turn-on timing (critical point) of the switching element QM (1) can be known from the equation (6) so that the M_ON signal (14) is input to the driving circuit 12 at the turn-on timing. The M_ON signal (14) output from the off period generator 13 turns on the switching element QM (1) to thereby determine the end timing of the off period Toff (the end of Toff is equal to the start of Ton) and determine the off period Toff. The M_OFF signal and the S_OFF signal output from the on period generators 11 and 31 turn off the switching elements QM (1) and QS (2) to thereby determine the end timing of each on period Ton (the end of Ton is equal to the start of Toff) and determine the on period Ton. Incidentally, the switching cycle of the master signal Msw and the M_ON signal (14) becomes equal to (Ton+Toff). The driving circuit 12 generates the master signal Msw based on the M_OFF signal and the M_ON signal input to the driving circuit 12, and inputs the master signal Msw into the gate of the switching element QM (1) to control the on/off of the switching element QM (1). Now, the master signal Msw will be described. Because one of the M_OFF signal and the M_ON signal starts at the end point of the other signal and the master signal Msw is a combination of the M_OFF signal and the M_ON signal, the waveform of the master signal Msw becomes finally equal to that of the M_ON signal.

Next as for the slave-side control circuit 30, as shown in FIG. 2, an on phase controller 33 delays the rising timing of the slave signal Ssw for a half cycle from the rising timing of the master signal Msw (which is equal to the rising timing of the M_ON signal (14)). Incidentally, the detailed configuration of the on phase controller will be described later with reference to FIGS. 3 and 4. Accordingly, the master-side control circuit 10 critically controls the switching element QM (1) based on the master signal Msw whereas the slave-side control circuit 30 critically controls the switching element QS (2) based on the slave signal Ssw with a phase difference of 180° from the master signal Msw. The falling timing of the slave signal Ssw is determined by the on period generator 31 of the slave-side control circuit 30, similarly to the master-side control circuit 10.

The operation of the two-phase critical interleaved PFC boost converter according to the first embodiment of the invention as shown in FIG. 1 will be described here with reference to the time chart of FIG. 2. Incidentally, the description of FIG. 2 is made prior to the description of FIGS. 3 and 4 but see FIGS. 3 and 4 as for parts that are not shown in FIG. 1. As shown in FIG. 2, (1) In a period T1, a capacitor Ca is charged with an initial value of a bias voltage Vbias at a charging current Ic, so that the voltage VCa between the opposite ends of the capacitor Ca increases linearly up to the end of the period T1. The final voltage VCa between the opposite ends of the capacitor Ca gives signal cycle information on the master signal Msw.

(2) At the rising timing in a period T2, the capacitor Ca begins to be discharged at a discharging current Id twice as high as the charging current Ic. The timing that the voltage VCa between the opposite ends of the capacitor Ca returns to the bias voltage Vbias becomes equal to the rising timing of a slave-side signal Sswa. In this manner, in the period T2, the slave-side signal Sswa is delayed for a half of the period T1 from the master signal Msw. In the period T2, the cycle of critical PFC is changed but the difference between the adjacent periods is very small (T1≈T2) so that the phase difference between the master signal Msw and the slave-side signal Sswa can be regarded as about 180°.

(3) In the period T2, a capacitor Cb is charged with an initial value of the bias voltage Vbias at a charging current Ic, so that the voltage VCb between the opposite ends of the capacitor Cb increases linearly up to the end of the period T2. The final voltage VCb between the opposite ends of the capacitor Cb gives signal cycle information of the master signal Msw.

(4) At the rising timing in a period T3, the capacitor Cb begins to be discharged at a discharging current Id twice as high as the charging current Ic. The timing that the voltage VCb between the opposite ends of the capacitor Cb returns to the bias voltage Vbias becomes equal to the rising timing of a slave-side signal Sswb. In this manner, in the period T3, the slave-side signal Sswb is delayed for a half of the period T2 from the master signal Msw.

(5) When the slave-side signal Sswa and the slave-side signal Sswb are ORed, a slave signal Ssw interleaved with the master signal Msw can be obtained. Incidentally, the falling timing of the slave signal Ssw is determined by the on period generator 31 of the slave-side control circuit 30 as described above.

From the above description, the two-phase critical interleaved PFC boost converter according to the first embodiment of the invention can achieve an analog type interleave control technique in which the on/off timing of the slave signal Ssw is generated based on the on timing of the master signal Msw. The cycle information on the master signal Msw is given by the charged voltage of the capacitor Ca, so that the on/off timing a(Sswa) in the next period of the slave signal Ssw is determined from the timing of completion of discharge of the capacitor Ca in such a manner that the on timing is determined directly and the off timing is determined indirectly. The ratio of the value of the discharging current to the value of the charging current of the capacitor Ca is set in accordance with a required phase difference. Specifically, see the following equation (7).

Moreover, because the capacitor Cb is used to perform the same operation as that of the capacitor Ca but one-period shifted from the capacitor Ca, the on/off timing b(Sswb) of the slave signal Ssw can be determined directly (on) and indirectly (off) from the timing of completion of discharge of the capacitor Cb in the charging period of the capacitor Ca.

When the timing a(Sswa) and the timing b(Sswb) are ORed, on/off timing signals of the slave signal Ssw with a predetermined phase difference from the master signal Msw can be obtained.

In the two-phase critical interleaved PFC boost converter, the relation between the discharging current Id and the charging current Ic of the capacitor can be set as follows.

$$Id = 2 \cdot Ic \tag{7}$$

As will be described later, this thought can be amplified as follows. Generally, an N-phase critical interleaved PFC boost converter includes a master-side control circuit, and (N−1)-phase slave-side control circuits. Accordingly, with respect to a k-phase order slave-side control circuit, the relation between the discharging current Id_k of a k-phase order capacitor and the charging current Ic common to the respective phases can be given as follows:

$$Id\_k = (N/k) \cdot Ic \tag{8}$$

in which k is equal to an integer of 1 to (N−1) in which N can be set as an integer of 3 or larger.

Figure 3:
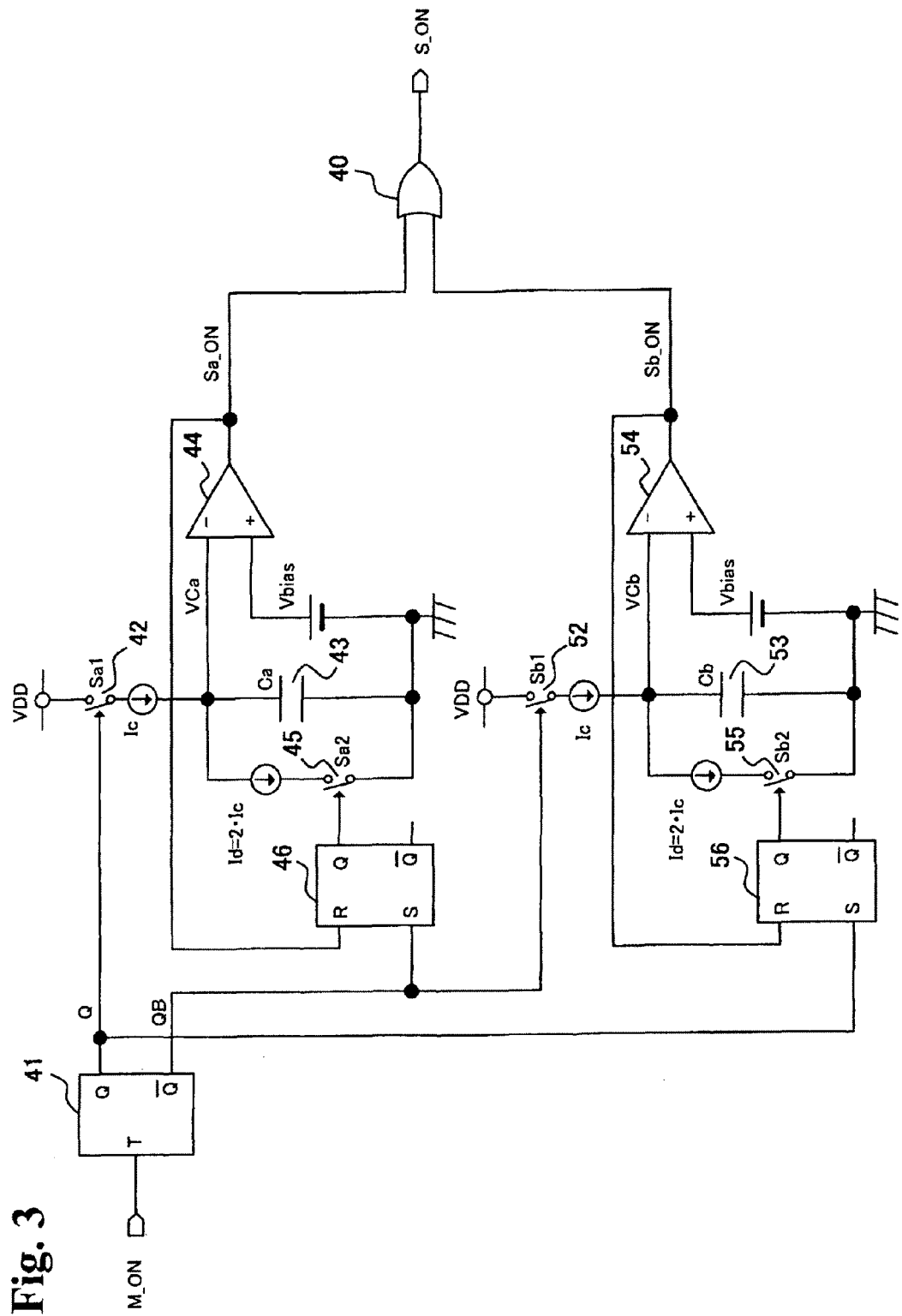
FIG. 3 is a diagram showing a circuit configuration of an on phase controller according to the first embodiment of the invention.
Figure 4:
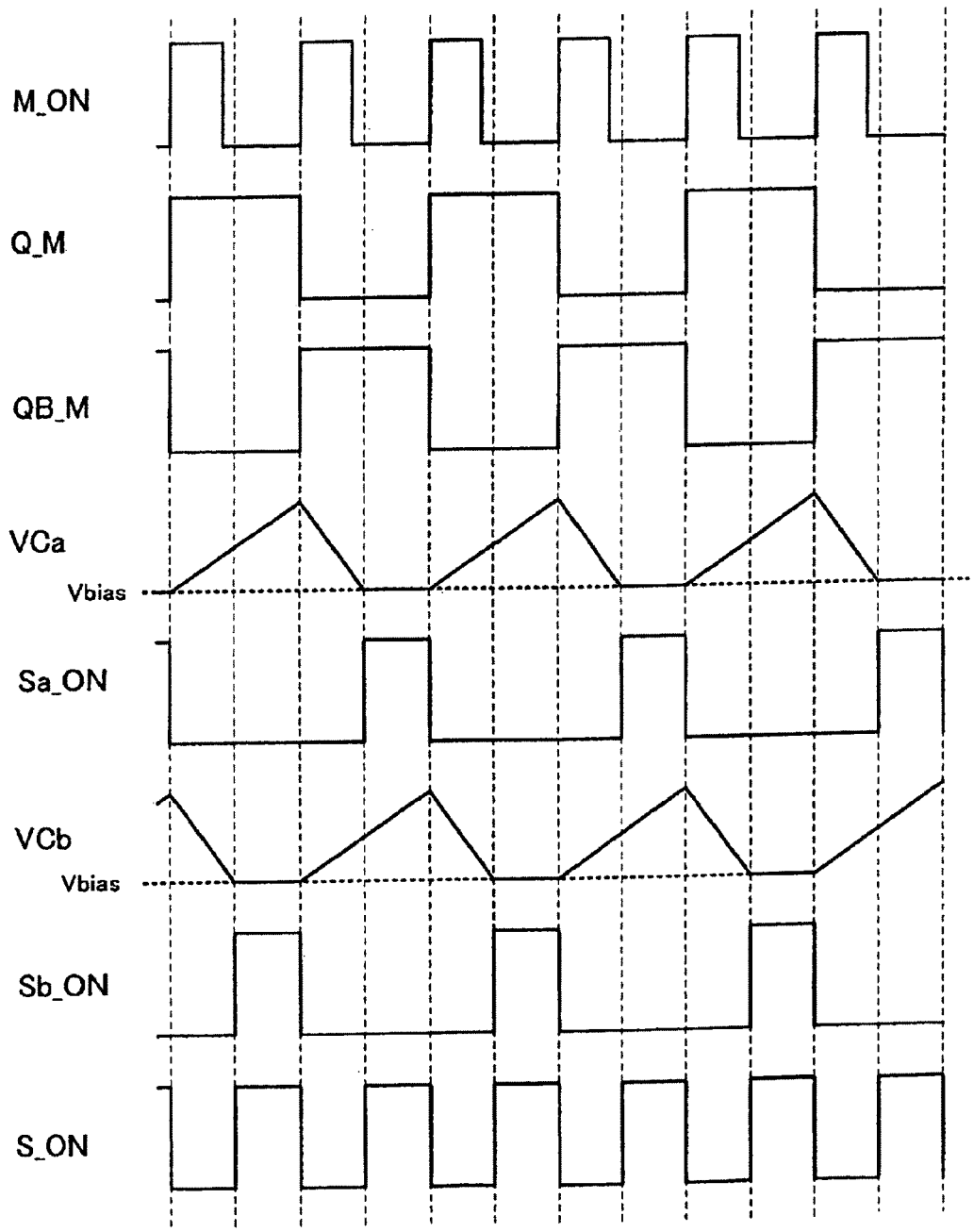
FIG. 4 is a time chart for explaining the operation of the on phase controller shown in FIG. 3.

FIG. 3 is a diagram showing a circuit configuration of the on phase controller according to the first embodiment of the invention. FIG. 4 is a time chart for explaining the operation of the on phase controller shown in FIG. 3.

The operation of the on phase controller according to the first embodiment of the invention will be described with reference to FIGS. 3 and 4. As shown in FIG. 3, the master-side signal M_ON 14 is input to a clock input terminal T of a toggle type flip-flop (T-FF) 41. As shown in the time chart of FIG. 4, when the master-side signal M_ON 14 rises initially, the Q output (Q_M) of the T-FF 41 becomes high in level. As a result, a switch Sa1 (42) turns on (conductive), so that the capacitor Ca 43 is charged at a charging current Ic during the period in which the Q output (Q_M) of the T-FF 41 is high. Incidentally, a switch Sa2 (45) on this occasion is off (non-conductive). At the rising of the master-side signal M_ON 14 in the next period, the T-FF 41 is inverted so that the Q-bar output (QB_M) of the T-FF 41 becomes high in level this time. This Q-bar output (QB_M) is input to a set terminal S of a reset-set type flip-flop (RS-FF) 46. Incidentally, the reset-set type flip-flop RS-FF 46 is a flip-flop with priority given to reset. For this reason, the Q output terminal of the RS-FF 46 becomes high in level, so the switch Sa2 (45) turns on (conductive). On the other hand, the switch Sa1 (42) is off (non-conductive). As a result, a discharging current Id flows so that electric charges stored in the capacitor Ca 43 are discharged at a current twice as high as the charging current Ic. Accordingly, the voltage VCa between the opposite ends of the capacitor Ca 43 decreases rapidly. That is, discharge is completed in a half of the period of the master-side signal M_ON. A comparator 44 detects that the voltage VCa between the opposite ends of the capacitor Ca 43 is not higher than the bias voltage Vbias, and turns the level of the output (Sa_ON) of the comparator 44 to high. This signal is output as a slave-side signal S_ON through an OR circuit 40 and input to a reset terminal R of the RS-FF 46. For this reason, the RS-FF 46 is reset so that the level of the Q output terminal becomes low and the switch Sa2 (45) turns off (non-conductive) to cut off the flow of the discharging current Id.

In a configuration shown in the lower half of FIG. 3, an operation reverse to the aforementioned operation is made. That is, at the time point that the master-side signal M_ON 14 rises initially, the QB output (QB_M) of the T-FF 41 becomes low in level. For this reason, a switch Sb1 (52) turns off (non-conductive). On the other hand, the QB output (QB_M) of the T-FF 41 is high in level. This signal is input to a set terminal S of an RS-FF 56, so that the RS-FF 56 is reset. Incidentally, the reset-set type flip-flop RS-FF 56 is also a flip-flop with priority given to reset. That is, a Q output terminal of the RS-FF 56 becomes high in level, so a switch Sb2 (55) turns on (conductive). For this reason, electric charges stored in a capacitor Cb 53 are discharged at a discharging current Id. Because the discharging current Id is set to be twice as high as the charging current Ic, discharge is completed in a half of the period of the master-side signal M_ON. A comparator 54 detects that the voltage VCb between the opposite ends of the capacitor Cb 53 reaches the bias voltage Vbias, and turns the level of the output (Sb_ON) of the comparator 54 to high. The Sb_ON signal is output as a slave-side signal S_ON through the OR circuit 40 and input to a reset terminal R of the RS-FF 56 to reset the RS-FF 56. When the RS-FF 56 is reset, the level of the Q output terminal of the RS-FF 56 becomes low and the switch Sa2 (45) turns off (non-conductive) to cut off the flow of the discharging current Id. When the master-side signal M_ON 14 rises next, the level of the QB output (QB_M) of the T-FF 41 becomes high. As a result, the switch Sb1 (52) turns on (conductive), so that the charging current Ic flows and the capacitor Cb 53 begins to be charged at a charging current Ic.

Figure 5:
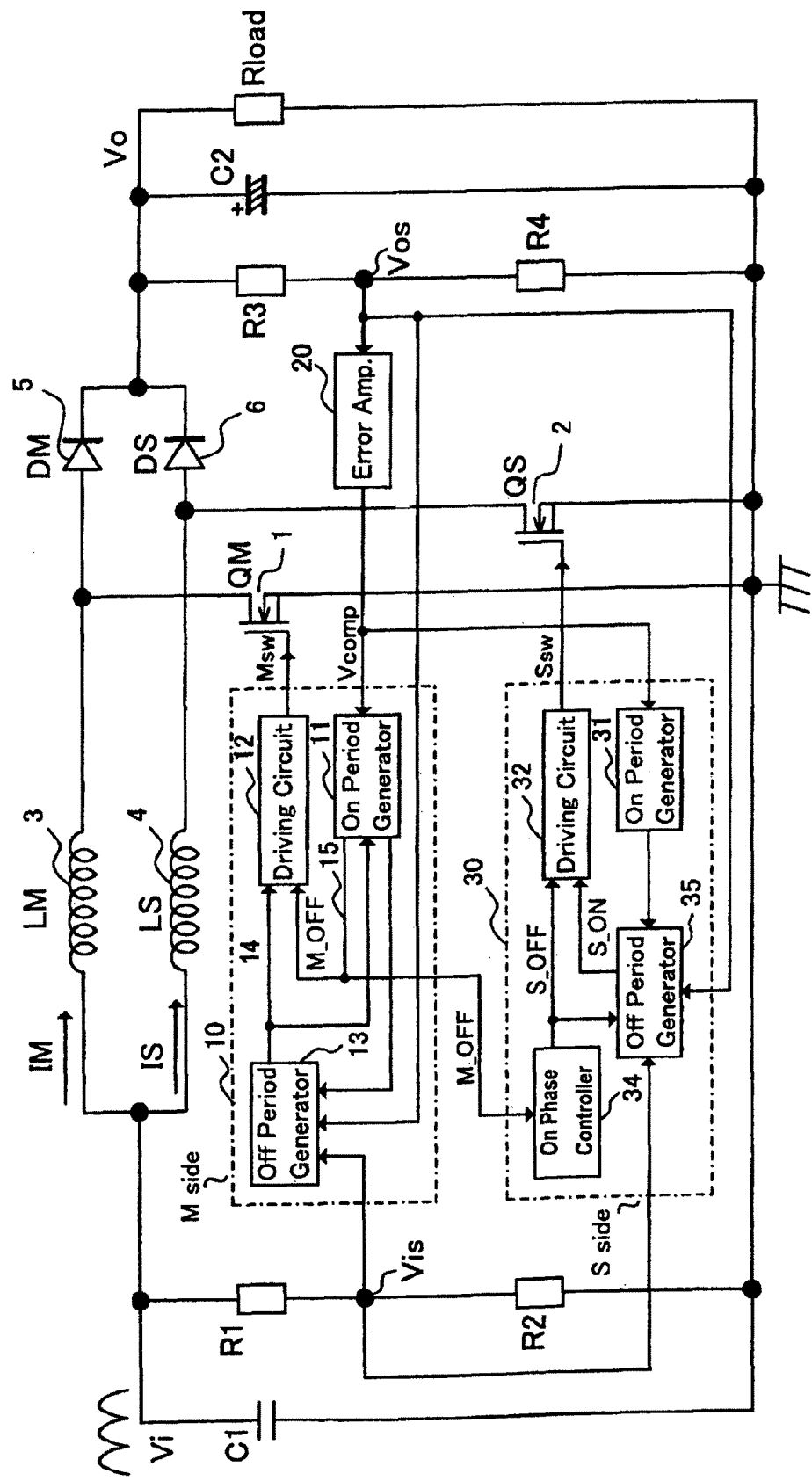
FIG. 5 is a diagram showing another circuit configuration of the two-phase critical interleaved PFC boost converter according to the first embodiment shown in FIG. 1.

FIG. 5 is a diagram showing another circuit configuration of the two-phase critical interleaved PFC (Power Factor Correction) boost converter according to the first embodiment shown in FIG. 1. In FIG. 5, an on phase controller 34 and an off period generator 35 are provided newly in place of the on phase controller 33 in the slave-side control circuit 30 shown in FIG. 1. With this configuration, the slave-side control circuit 30 can calculate an on period Ton independently and can generate an off period Toff by using the on period Ton. As a further circuit configuration that is not shown but is to be substituted for FIG. 5, the information on an on period Ton may be acquired from the master-side on period generator 11 so that an off period Toff can be generated based on the information.

Figure 12:
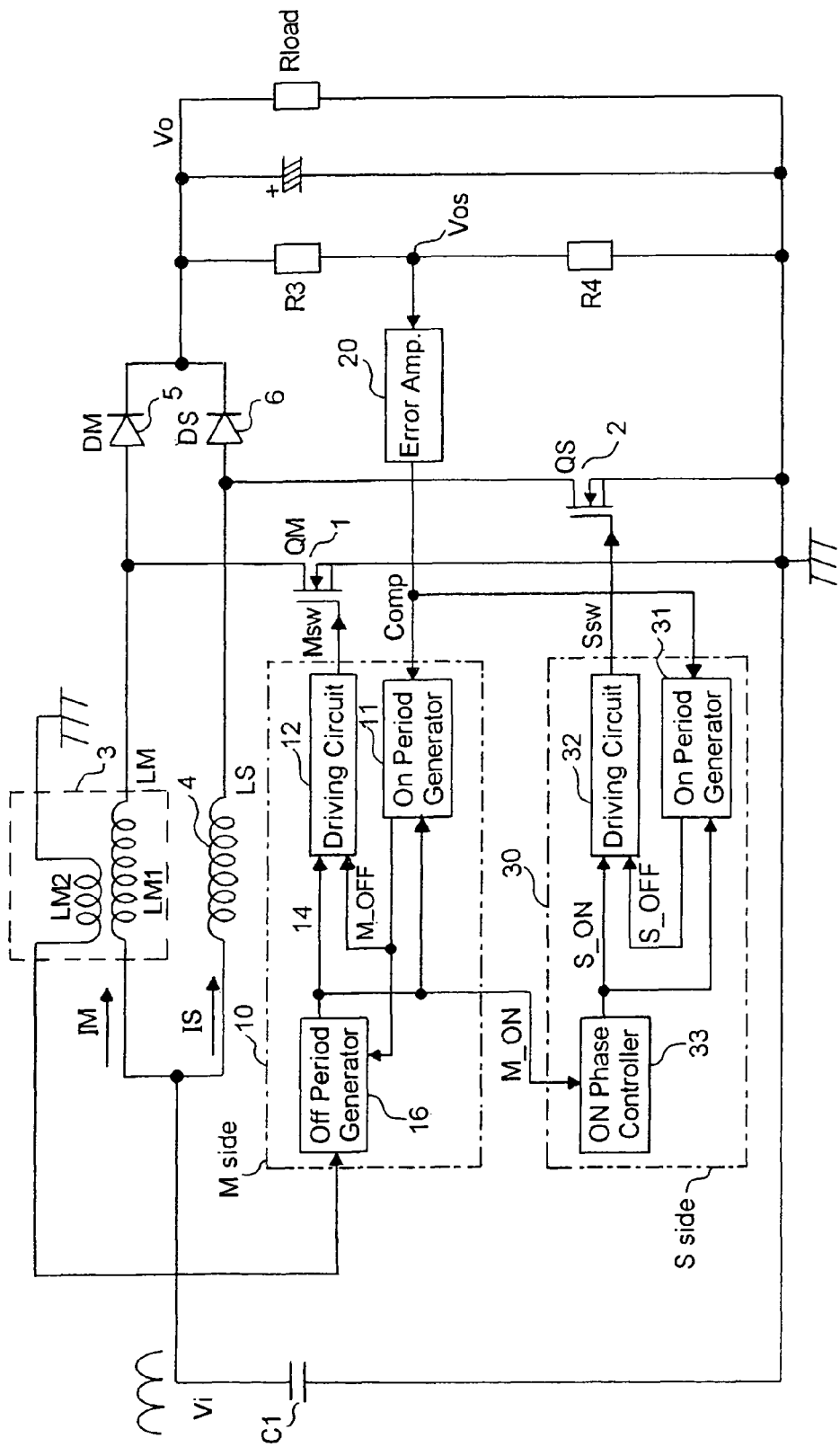
FIG. 12 is a diagram showing a circuit configuration in which a master-side off period generator outputs a turn-on signal by using auxiliary winding, as a modification of the first embodiment shown in FIG. 1.

FIG. 12 is a diagram showing a circuit configuration in which the master-side on period generator outputs a turn-on signal by using auxiliary winding, as a modification of the first embodiment shown in FIG. 1. That is, in FIG. 12, the inductor LM (3) is made of a combination of a main winding LM1 and an auxiliary winding LM2, so that a current flowing in the inductor LM (3) of the master-side converter can be detected. A master-side off period generator 16 detects the time that the current flowing in the inductor LM (3) of the master-side converter becomes zero, through the auxiliary winding LM2 and generates a turn-on signal M_ON 14. That is, the master-side off period generator 16 detects the time that the inductor current IM flowing in the main winding LM1 becomes zero, through the auxiliary winding LM2 coupled magnetically, generates a turn-on signal M_ON 14 and outputs the signal as a timing signal for turning on the switching element QM (1) of the master-side converter. Because the configuration except the above is the same as the configuration of the first embodiment shown in FIG. 1, description thereof will be omitted.

As described above, in the two-phase critical interleaved PFC boost converter according to the first embodiment of the invention, the on/off timing of the slave signal Ssw can be generated based on the on timing of the master signal Msw to thereby achieve a simple analog interleave control technique and provide a power factor-improved power supply device in which phase control accuracy can be kept high while a high power factor can be obtained in a simple configuration. Moreover, unlike the background art, this interleave control technique is not affected by variations in the capacitance of capacitors and offset voltages of comparators so that phase control accuracy can be improved. In addition, a constant current source is used for a current so that degradation in phase accuracy can be prevented.

Embodiment 2

Figure 6:
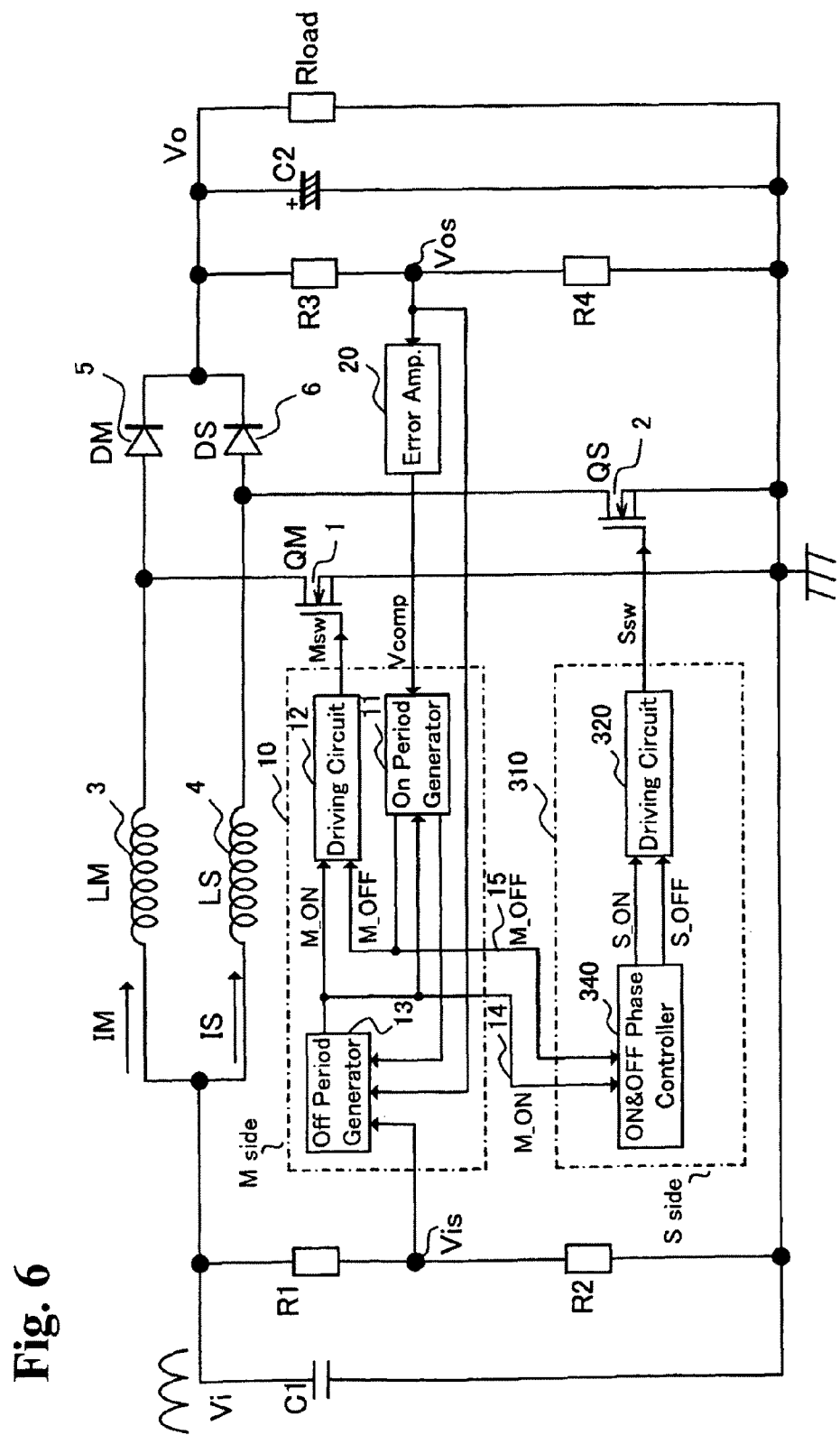
FIG. 6 is a diagram showing a circuit configuration of a two-phase critical interleaved PFC boost converter according to a second embodiment of the invention.
Figure 7:
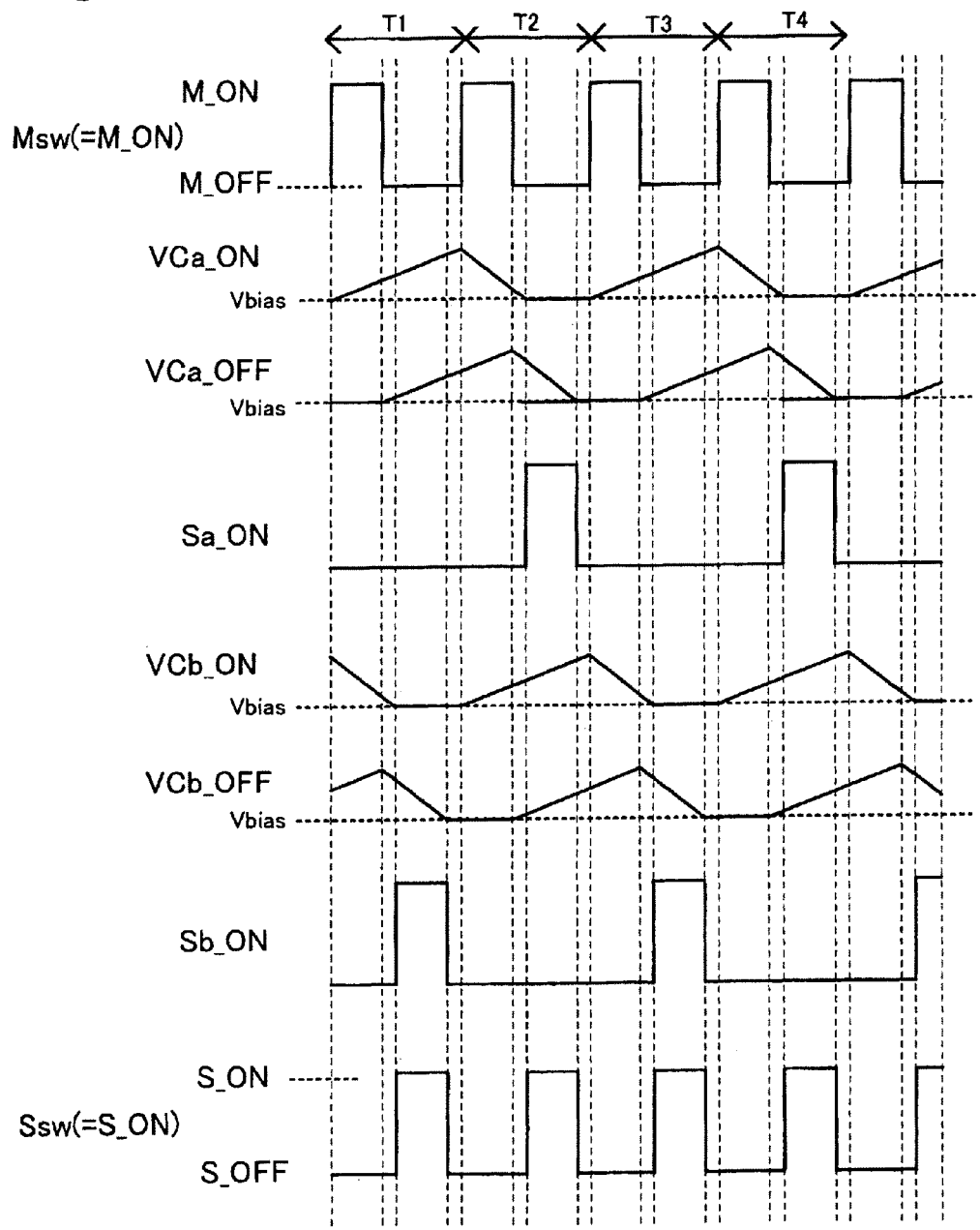
FIG. 7 is a time chart for explaining the operation of the two-phase critical interleaved PFC boost converter shown in FIG. 6.

FIG. 6 is a diagram showing a circuit configuration of a two-phase critical interleaved PFC (Power Factor Correction) boost converter according to a second embodiment of the invention. The first embodiment shown in FIG. 1 has been described in the case where only the on timing of the master signal Msw is delayed, whereas the second embodiment is described in the case where an on & off phase controller determines the on/off timing of the slave signal Ssw based on the on/off timing of the master signal Msw by delaying the on/off timing of the slave signal Ssw for a half period from the on/off timing of the master signal Msw. Incidentally, the master signal Msw and the M_ON signal are equal in waveform to each other, like the first embodiment. FIG. 7 is a time chart for explaining the operation of the two-phase critical interleaved PFC boost converter shown in FIG. 6.

The circuit configuration shown in FIG. 6 is a configuration of the two-phase critical interleaved PFC boost converter, similar to FIG. 1. The master-side control circuit 10 is configured to critically control the switching element QM (1) based on the master signal Msw. On the other hand, a slave-side control circuit 310 is configured to critically control the switching element QS (2) based on the slave signal Ssw with a phase difference of 180° from the master signal Msw.

Now, the configuration for critically controlling the switching element QM (1) based on the master signal Msw will be described. Like FIG. 1, the critical point of a critical PFC boost converter, that is, the turn-on timing of the switching element QM (1) is determined by application of a predetermined arithmetic operation based on the respective values of the on period of the switching element QM (1), the input voltage Vi and the output voltage Vo. Critical control is achieved based on the turn-on timing of the switching element QM (1).

The differences in FIG. 6 from the configuration of FIG. 1 include the fact that the on period generator 31 existing in the configuration of FIG. 1 is not provided in the slave-side control circuit 310 but an on & off phase controller 340 is provided instead so that outputs S_ON and S_OFF of the on & off phase controller 340 are input to a driving circuit 320. Besides the master signal M_ON 14 shown in the configuration of FIG. 1, the output M_OFF 15 of the on period generator 11 only input to the driving circuit 12 in the configuration of FIG. 1 is further input to the on & off phase controller 340 in addition to the master signal M_NO 14 shown in the configuration of FIG. 1. Incidentally, the detailed configuration of the on & off phase controller 340 will be described later with reference to FIG. 8 and FIGS. 9A to 9C.

The operation of the two-phase critical interleaved PFC boost converter according to the second embodiment of the invention as shown in FIG. 6 will be described with reference to FIG. 7. Incidentally, the description of FIG. 7 is made prior to the description of FIG. 8 and FIGS. 9A to 9C but see FIG. 8 and FIGS. 9A to 9C as for parts that are not shown in FIG. 6. As shown in FIG. 7, (1) At the rising timing of the master signal Msw in a period T1, a first capacitor Ca_ON begins to be charged with an initial value of a bias voltage Vbias at a charging current Ic, so that the voltage VCa_ON between the opposite ends of the first capacitor Ca_ON increases linearly up to the end of the period T1. The final voltage VCa_ON between the opposite ends of the capacitor Ca_ON gives signal cycle information on the master signal Msw. Incidentally, the H (high level) of the master signal Msw shows that the M_ON signal is active (to turn on the switching element QM (1)). The L (low level) of the master signal Msw shows that the M_OFF signal is active (to turn off the switching element QM (1)). At the start timing of the M_OFF signal (master signal Msw=L) in the period T1, a second capacitor Ca_OFF begins to be charged with an initial value of the bias voltage Vbias at a charging current Ic, so that the voltage VCa_OFF between the opposite ends of the second capacitor Ca_OFF increases linearly up to the start timing of the M_OFF signal in a period T2. The final voltage VCa_OFF between the opposite ends of the capacitor Ca_OFF gives signal cycle information on the master signal Msw.

(2) At the rising timing of the master signal Msw in a period T2, the first capacitor Ca_ON begins to be discharged at a discharging current Id twice as high as the charging current Ic. The timing that the voltage VCa_ON between the opposite ends of the first capacitor Ca_ON returns to the bias voltage Vbias becomes equal to the rising timing of a slave-side signal Sa_ON. In this manner, in the period T2, the rising of the slave signal Sa_ON is delayed for a half of the period T2 from the rising of the master signal Msw. In the period T2, the cycle of critical PFC is changed but the difference between the adjacent periods is very small (T1≈T2) so that the phase difference between the rising of the master signal Msw and the rising of the slave signal Sa_ON can be regarded as about 180°.

At the start timing of the master signal M_OFF in the period T2, the second capacitor Ca_OFF begins to be discharged at a discharging current Id twice as high as the charging current Ic. The timing that the voltage VCa_OFF between the opposite ends of the second capacitor Ca_OFF returns to the bias voltage Vbias becomes equal to the falling timing of the slave-side signal Sa_ON. Similarly to the above description, the phase difference between the falling of the master signal Msw and the falling of the slave signal Sa_ON can be regarded as about 180°.

(3) At the rising timing of the master signal Msw in the period T2, a third capacitor Cb_ON begins to be charged with an initial value of the bias voltage Vbias at a charging current Ic, so that the voltage VCb_ON between the opposite ends of the third capacitor Cb_ON increases linearly up to the end of the period T2. The final voltage VCb_ON between the opposite ends of the capacitor Cb_ON gives signal cycle information on the master signal Msw. On the other hand, at the start timing of the M_OFF signal in the period T2, a fourth capacitor Cb_OFF begins to be charged with an initial value of the bias voltage Vbias at a charging current Ic, so that the voltage VCb_OFF between the opposite ends of the fourth capacitor Cb_OFF increases linearly up to the start timing of the M_OFF signal in a period T3. The final voltage VCb_OFF between the opposite ends of the capacitor Cb_OFF gives signal cycle information of the master signal Msw.

(4) At the rising timing of the master signal Msw in the period T3, the third capacitor Cb_ON begins to be discharged at a discharging current Id twice as high as the charging current Ic. The timing that the voltage VCb_ON between the opposite ends of the third capacitor Cb_ON returns to the bias voltage Vbias becomes equal to the rising timing of the slave-side signal Sb_ON. In this manner, in the period T3, the rising of the slave signal Sb_ON is delayed for a half of the period T3 from the rising of the master signal Msw. In the period T3, the cycle of critical PFC is changed but the difference between the adjacent periods is very small (T2≈T3) so that the phase difference between the rising of the master signal Msw and the rising of the slave signal Sb_ON can be regarded as about 180°.

At the start timing of the master signal M_OFF in the period T3, the fourth capacitor Cb_OFF begins to be discharged at a discharging current Id twice as high as the charging current Ic. The timing that the voltage VCb_OFF between the opposite ends of the fourth capacitor Cb_OFF returns to the bias voltage Vbias becomes equal to the falling timing of the slave-side signal Sb_ON (Sb_ON (low level)). Similarly to the above description, the phase difference between the falling of the master signal Msw and the falling of the slave signal Sb_ON can be regarded as about 180°.

(5) When the slave signal Sa_ON and the slave signal Sb_ON are ORed, a slave signal Ssw=S_ON interleaved with the master signal Msw=M_ON 14 can be obtained. Incidentally, the H (high level) of the slave signal Ssw shows that the S_ON signal is active (to turn on the switching element QS (2)). The L (low level) of the slave signal Ssw shows that the S_OFF signal is active (to turn off the switching element QS (2)). In addition, like the master signal Msw, the slave signal Ssw has the same waveform as the S_ON signal which is a signal for turning on the switching element QS (2).

From the above description, the two-phase critical interleaved PFC boost converter according to the second embodiment of the invention can achieve an analog type interleave control technique in which the on/off timing of the slave signal Ssw is generated based on the on/off timing of the master signal Msw. The cycle information of the master signal Msw is given by the charged voltages of the first and second capacitors Ca_ON and Ca_OFF. The on/off timing a(Sa_ON) of the slave signal Ssw is determined from completion of discharge of the first and second capacitors Ca_ON and Ca_OFF. The ratio of the value of the discharging current to the value of the charging current in each of the first and second capacitors Ca_ON and Ca_OFF is set in accordance with a required phase difference. Specifically, see the equations (7) and (8).

Moreover, because the third and fourth capacitors Cb_ON and Cb_OFF are used to perform the same operations as those of the first and second capacitors Ca_ON and Ca_OFF but one-period shifted from the first and second capacitors Ca_ON and Ca_OFF, the on/off timing b(Sb_ON) of the slave signal Ssw can be determined from discharge of the third and fourth capacitors Cb_ON and Cb_OFF in the charging period of the first and second capacitors Ca_ON and Ca_OFF.

When the timing a (Sa_ON) and the timing b (Sb_ON) are ORed, on/off timing signals of the slave signal Ssw with a predetermined phase difference from the master signal Msw can be obtained.

Figure 8:
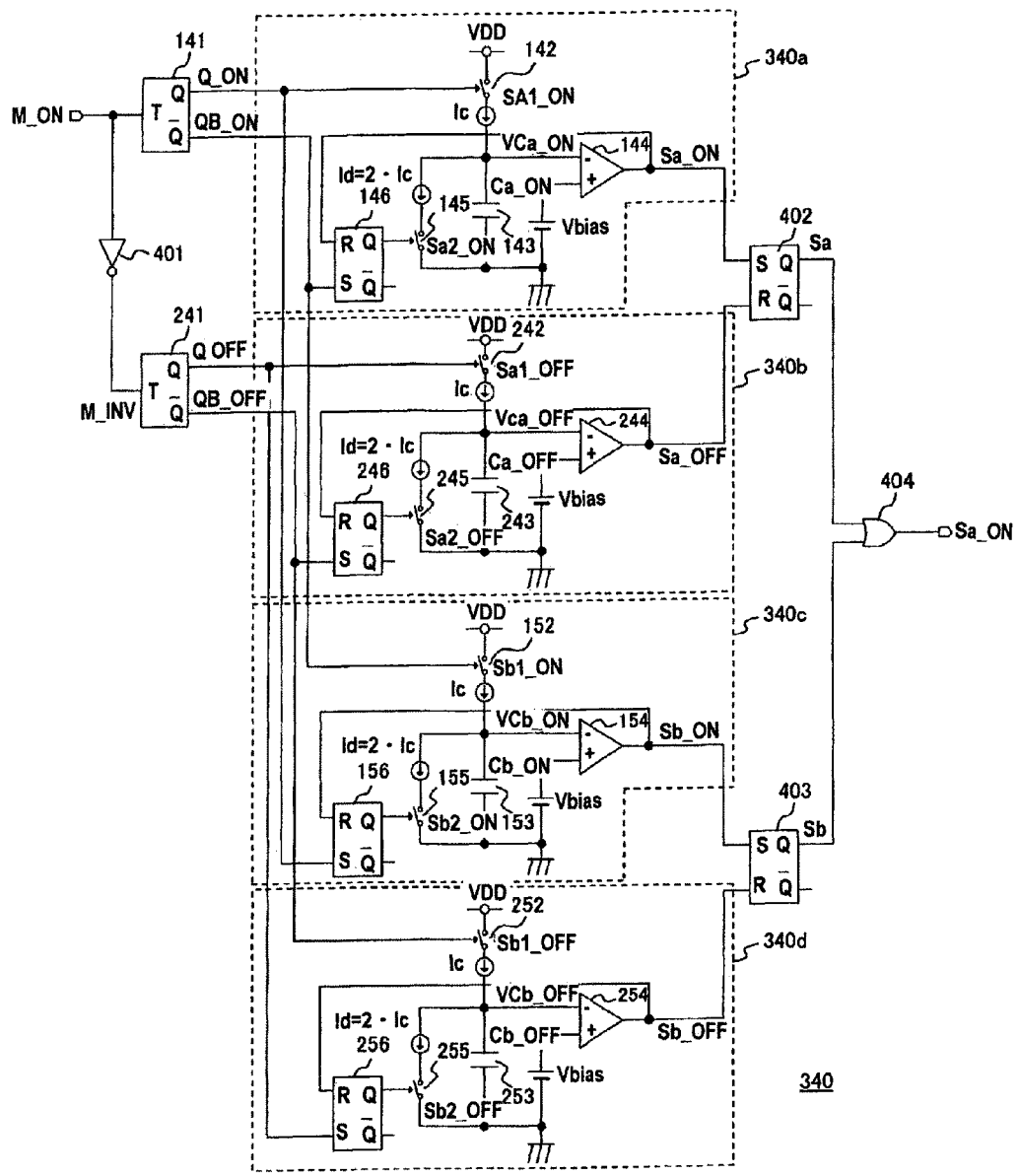
FIG. 8 is a diagram showing a circuit configuration of an on & off phase controller according to the second embodiment of the invention.
Figure 9A:
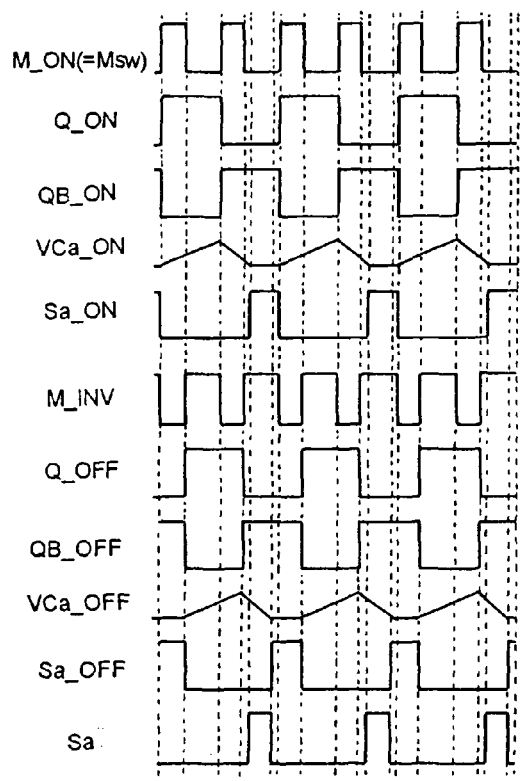
FIGS. 9A to 9C are time charts for explaining the operation of the on & off phase controller shown in FIG. 8.
Figure 9B:
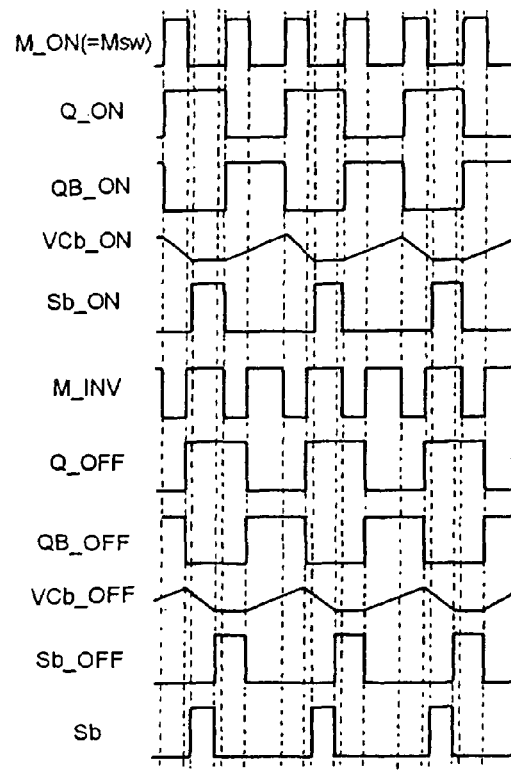
Figure 9C:
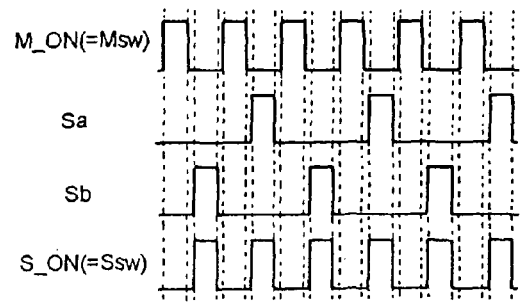

FIG. 8 is a diagram showing a circuit configuration of the on & off phase controller according to the second embodiment of the invention. FIGS. 9A to 9C are time charts for explaining the operation of the on & off phase controller shown in FIG. 8.

The operation of the on & off phase controller according to the second embodiment of the invention will be described with reference to FIG. 8 and FIGS. 9A to 9C. The on & off phase controller 340 according to the second embodiment of the invention includes the first and second capacitors Ca_ON and Ca_OFF for generating the timing a(Sa_ON) of the slave signal Ssw, and the third and fourth capacitors Cb_ON and Cb_OFF for generating the timing b (Sb_ON) of the slave signal Ssw, as described also in FIG. 7. The charging/discharging operations of these capacitors will be described with reference to FIG. 8 and FIGS. 9A to 9C.

There are provided a toggle type flip-flop (T-FF) 141 which receives the master-side signal M_ON (=Msw) and a toggle type flip-flop (T-FF) 241 which receives a signal M_INV obtained by inverting the master-side signal M_ON by an inverter 401. When the T-FF 141 receives the rising of the master-side signal M_ON, the Q output terminal of the T-FF 141 outputs a Q_ON signal (=H). The Q_ON signal is input as a signal for controlling the on/off of a switch Sa1_ON 142 which can feed a charging current Ic to a first capacitor Ca_ON 143 (the switch Sa1_ON 142 is turned on by the Q_ON signal=H). The Q_ON signal is further input to a set input terminal S of a reset-set type flip-flop (RS-FF) 156 with priority given to reset. The RS-FF 156 controls the on/off of a switch Sb2_ON 155 which can feed a discharging current Id of a third capacitor Cb_ON 153.

When the T-FF 141 receives the master-side signal M_ON, the Q-bar output terminal of the T-FF 141 outputs a QB_ON signal (=H). The QB_ON signal is input to a set input terminal S of a reset-set type flip-flop (RS-FF) 146 with priority given to reset. The RS-FF 146 controls the on/off of a switch Sa2_ON 145 which can feed a discharging current Id of the first capacitor Ca_ON 143. The QB_ON signal is further input as a signal for controlling the on/off of a switch Sb1_ON 152 which can feed a charging current Ic to the third capacitor Cb_ON 153 (the switch Sb1_ON 152 is turned on by the QB_ON signal=H).

On the other hand, when the T-FF 241 receives the rising of the inverted signal M_INV of the master-side signal M_ON, a Q output terminal of the T-FF 241 outputs a Q_OFF signal (=H). The Q_OFF signal is input as a signal for controlling the on/off of a switch Sa1_OFF 242 which can feed a charging current Ic to a second capacitor Ca_OFF 243 (the switch Sa1_OFF 242 is turned on by the Q_OFF signal=H). The Q_OFF signal is further input to a set input terminal S of a reset-set type flip-flop (RS-FF) 256 with priority given to reset. The RS-FF 256 controls the on/off of a switch Sb2_OFF 255 which can feed a discharging current Id of a fourth capacitor Cb_OFF 253.

When the T-FF 241 receives the rising of the inverted signal M_INV of the master-side signal M_ON, a Q-bar output terminal of the T-FF 241 outputs a QB_OFF signal (=H). The QB_OFF signal is input to a set input terminal S of a reset-set type flip-flop (RS-FF) 246 with priority given to reset. The RS-FF 246 controls the on/off of a switch Sb2_OFF 245 which can feed a discharging current Id of the second capacitor Ca_OFF 243. The QB_OFF signal is further input as a signal for controlling the on/off of a switch Sb1_OFF 252 which can feed a charging current Ic to the fourth capacitor Cb_OFF 253 (the switch Sb1_OFF 252 is turned on by the QB_OFF signal=H).

When the level of the Q_ON signal output from the Q output terminal of the T-FF 141 receiving the master-side signal M_ON is high, the switch Sa1_ON 142 turns on based on the Q_ON signal input to the switch Sa1_ON 142. As a result, the charging current Ic flows so that the first capacitor Ca_ON 143 begins to be charged. When charging starts, as shown in FIG. 9A, the voltage VCa_ON between the opposite ends of the first capacitor Ca_ON 143 increases linearly in the period. Then, at the rising in the next period, discharging starts. Discharging is completed in about a half of the period (exactly a half if the period is not changed). That is, when the level of the QB_ON signal output from the Q-bar output terminal of the T-FF 141 at the rising in the next period becomes high, the level of the Q output terminal of the RS-FF 146 becomes high based on the QB_ON signal input to the set input terminal S of the RS-FF 146. As a result, the switch Sa2_ON 145 turns on, so that electric charges stored in the first capacitor Ca_ON 143 are discharged at a discharging current Id which is set to be twice as high as the charging current Ic. For this reason, discharging is completed in about a half of the period (exactly a half if the period is not changed), so that the voltage VCa_ON between the opposite ends of the first capacitor Ca_ON 143 is equalized to the bias voltage Vbias. A first comparator 144 detects that the voltage VCa_ON between the opposite ends of the first capacitor Ca_ON 143 is equalized to the bias voltage Vbias, and outputs a high-level signal Sa_ON. The high-level signal Sa_ON is input to a set input terminal S of a reset-set type flip-flop (RS-FF) 402. For this reason, a high-level signal Sa is output from an output terminal Q of the RS-FF 402. The signal is output as a slave-side signal S_ON (=Ssw) through an OR circuit 404. The high-level signal Sa_ON is further input to a reset input terminal R of the RS-FF 146, so that the level of the Q output terminal of the RS-FF 146 becomes low so that the switch Sa2_ON 145 turns off (non-conductive). For this reason, the flow of the discharging current Id is cut off, so that the voltage VCa_ON between the opposite ends of the first capacitor Ca_ON 143 is kept equal to the bias voltage Vbias before charging the first capacitor Ca_ON 143 starts in the next period. This procedure is repeated, so that the rising timing of the signal Sa defining the slave-side signal S_ON is obtained.

When the level of the Q_OFF signal output from the Q output terminal of the T-FF 241 receiving the inverted signal M_INV of the master-side signal M_ON is high, the switch Sa1_OFF 242 turns on based on the high-level Q_OFF signal input to the switch Sa1_OFF 242. As a result, a charging current Ic flows, so that the second capacitor Ca_OFF 243 begins to be charged. When charging starts, as shown in FIG. 9A, the voltage VCa_OFF between the opposite ends of the second capacitor Ca_OFF 243 increases linearly in the period. Then, at the rising in the next period, discharging starts. Discharging is completed in about a half of the period (exactly a half if the period is not changed). That is, when the level of the QB_OFF signal output from the Q-bar output terminal of the T-FF 241 at the rising in the next period becomes high, the level of the Q output terminal of the RS-FF 246 becomes high based on the QB_OFF signal input to the set input terminal S of the RS-FF 246. As a result, the switch Sa2_OFF 245 turns on, so that electric charges stored in the second capacitor Ca_OFF 243 are discharged at a discharging current Id which is set to be twice as high as the charging current Ic. That is, discharging is completed in about a half of the period (exactly a half if the period is not changed), so that the voltage VCa_OFF between the opposite ends of the second capacitor Ca_OFF 243 is equalized to the bias voltage Vbias. A second comparator 244 detects that the voltage VCa_OFF between the opposite ends of the second capacitor Ca_OFF 243 is equalized to the bias voltage Vbias, and outputs a high-level signal Sa_OFF. The high-level signal Sa_OFF is input to a reset input terminal R of the RS-FF 402. For this reason, the high-level signal Sa output from the output terminal Q of the RS-FF 402 is cut off (the level of the output of the signal Sa becomes low), so that the level of the signal S_ON output from the OR circuit 404 becomes low. The level of the Q output terminal of the RS-FF 246 becomes low based on the high-level signal Sa_OFF input to the reset input terminal R of the RS-FF 246. For this reason, the switch Sa2_OFF 245 is turned off to cut off the flow of the discharging current Id, so that the voltage VCa_OFF between the opposite ends of the second capacitor Ca_OFF 243 is kept equal to the bias voltage Vbias before charging the second capacitor Ca_OFF 243 starts in the next period. This procedure is repeated, so that the falling timing of the signal Sa defining the slave-side signal S_ON is obtained.

The charging/discharging operations of the first and second capacitors Ca_ON and Ca_OFF for generating the on/off timing a (Sa_ON) in the slave-side signal S_ON (=Ssw) have been described above.

The charging/discharging operations of the third and fourth capacitors Cb_ON and Cb_OFF for generating the on/off timing b (Sb_ON) in the slave-side signal S_ON will be described below.

When the level of the QB_ON signal output from the Q-bar output terminal of the T-FF 141 receiving the master-side signal M_ON (=Msw) is high, the switch Sb1_ON 152 turns on based on the QB_ON signal input to the switch Sb1_ON 152. As a result, the charging current Ic flows so that the third capacitor Cb_ON 153 begins to be charged. When charging starts, as shown in FIG. 9B, the voltage VCb_ON between the opposite ends of the third capacitor Cb_ON 153 increases linearly in the period. Then, at the rising in the next period, discharging starts. Discharging is completed in about a half of the period (exactly a half if the period is not changed). That is, when the level of the Q_ON signal output from the Q output terminal of the T-FF 141 becomes high at the rising in the next period, the level of the Q output terminal of the RS-FF 156 becomes high based on the Q_ON signal input to the set input terminal S of the RS-FF 156. As a result, the switch Sb2_ON 155 turns on, so that electric charges stored in the third capacitor Cb_ON 153 are discharged at a discharging current Id which is set to be twice as high as the charging current Ic. That is, discharging is completed in about a half of the period (exactly a half if the period is not changed), so that the voltage VCb_ON between the opposite ends of the third capacitor Cb_ON 153 is equalized to the bias voltage Vbias. A third comparator 154 detects that the voltage VCb_ON between the opposite ends of the third capacitor Cb_ON 153 is equalized to the bias voltage Vbias, and outputs a high-level signal Sb_ON. The high-level signal Sb_ON is input to a set input terminal S of a reset-set type flip-flop (RS-FF) 403. As a result, a high-level signal Sb is output from an output terminal Q of the RS-FF 403. The signal is output as a slave-side signal S_ON (=Ssw) through the OR circuit 404. The high-level signal Sb_ON is further input to a reset input terminal R of the RS-FF 156, so that the level of the Q output terminal of the RS-FF 156 becomes low. As a result, the switch Sb2_ON 155 turns off to cut off the flow of the discharging current Id, so that the voltage VCb_ON between the opposite ends of the third capacitor Cb_ON 153 is kept equal to the bias voltage Vbias before charging the third capacitor Cb_ON 153 starts in the next period. This procedure is repeated, so that the rising timing of the signal Sb defining the slave-side signal S_ON is obtained.

Next, when the level of the QB_OFF signal output from the Q-bar output terminal of the T-FF 241 receiving the inverted signal M_INV of the master-side signal M_ON is high, the switch Sb1_OFF 252 turns on based on the high-level QB_OFF signal input to the switch Sb1_OFF 252. As a result, a charging current Ic flows, so that the fourth capacitor Cb_OFF 253 begins to be charged. When charging starts, as shown in FIG. 9B, the voltage VCb_OFF between the opposite ends of the fourth capacitor Cb_OFF 253 increases linearly in the period. Then, at the rising in the next period, discharging starts. Discharging is completed in about a half of the period (exactly a half if the period is not changed). That is, when the level of the Q_OFF signal output from the Q output terminal of the T-FF 241 becomes high at the rising in the next period, the level of the Q output terminal of the RS-FF 256 becomes high based on the Q_OFF signal input to the set input terminal S of the RS-FF 256. As a result, the switch Sb2_OFF 255 turns on, so that electric charges stored in the fourth capacitor Cb_OFF 253 are discharged at a discharging current Id which is set to be twice as high as the charging current Ic. That is, discharging is completed in about a half of the period (exactly a half if the period is not changed), so that the voltage VCb_OFF between the opposite ends of the fourth capacitor Cb_OFF 253 is equalized to the bias voltage Vbias. A fourth comparator 254 detects that the voltage VCb_OFF between the opposite ends of the fourth capacitor Cb_OFF 253 is equalized to the bias voltage Vbias, and outputs a high-level signal Sb_OFF. The high-level signal Sb_OFF is input to a reset input terminal R of the RS-FF 403. For this reason, the level of the output terminal Q of the RS-FF 403 becomes low, so that the level of the signal Sb becomes low. As a result, the level of signal S_ON output from the OR circuit 404 becomes low. The high-level signal Sb_OFF is further input to a reset terminal R of the RS-FF 256. As a result, the level of the Q output terminal of the RS-FF 256 becomes low to turn off the switch Sb2_OFF 255. As a result, the discharging current Id is prevented from flowing, so that the voltage VCb_OFF between the opposite ends of the fourth capacitor Cb_OFF 253 is kept equal to the bias voltage Vbias before charging the fourth capacitor Cb_OFF 253 starts in the next period. This procedure is repeated, so that the falling timing of the signal Sb defining the slave-side signal S_ON is obtained.

The charging/discharging operations of the third and fourth capacitors Cb_ON and Cb_OFF for generating the on/off timing b (Sb_ON) in the slave-side signal S_ON (=Ssw) have been described above.

Referring back to FIGS. 9A and 9B in connection to the operations of the first and third capacitors Ca_ON 143 and Cb_ON 153 in the above description, it is understood that the third capacitor Cb_ON 153 performs the same operation as the first capacitor Ca_ON 143 while being shifted by one period from the first capacitor Ca_ON 143. It is also understood that the third capacitor Cb_ON 153 is discharged during charging of the first capacitor Ca_ON 143 to determine the on/off timing Sb_ON of the slave-side signal S_ON.

In each of the on & off periods of the slave-side signal S_ON obtained as described above, when the timing a (Sa_ON) and the timing b (Sb_ON) are ORed as shown in FIG. 9C, an on & off timing signal of the slave-side signal S_ON with a predetermined phase difference from the master-side signal M_ON can be obtained.

The on & off phase controller shown in FIG. 8 has a configuration that the output signals of circuit blocks 340a and 340b are input to the RS-FF 402 to generate a signal Sa, output signals of circuit blocks 340c and 340d are input to the RS-FF 403 to generate a signal Sb, and then the signals Sa and Sb are ORed to generate a signal S_ON. However, the signal S_ON can also be generated by another configuration. The other configuration will be described below without reference to any drawing.

The circuit blocks 340a and 340c are circuits which obtain the on timing (rising timing) of the slave-side signal S_ON (=Ssw) by shifting the on timing (rising timing) of the master-side signal M_ON (=Msw) by a half period alternately for every period. The circuit blocks 340a and 340c can be generically called 'on phase controller'. Similarly, the circuit blocks 340b and 340d are circuits which obtain the off timing (falling timing) of the slave-side signal S_ON (=Ssw) by shifting the off timing (falling timing) of the master-side signal M_ON (=Msw) by a half period alternately for every period. The circuit blocks 340b and 340d can be generically called 'off phase controller'.

That is, when Sa_ON and Sb_ON output from the circuit blocks 340a and 340c which form an on phase controller are ORed by an OR circuit which is, for example, a logical gate, a signal S_RISE indicating the rising timing of the signal S_ON can be obtained. Similarly, when Sa_OFF and Sb_OFF output from the circuit blocks 340b and 340d which form an off phase controller are ORed by an OR circuit which is, for example, a logical gate, a signal S_FALL indicating the falling timing of the signal S_ON can be obtained. When the signal S_RISE and the signal S_FALL are input to a set terminal and a reset terminal of a reset-set type flip-flop, respectively, a signal S_ON can be obtained from a Q output terminal of the reset-set type flip-flop.

Figure 13:
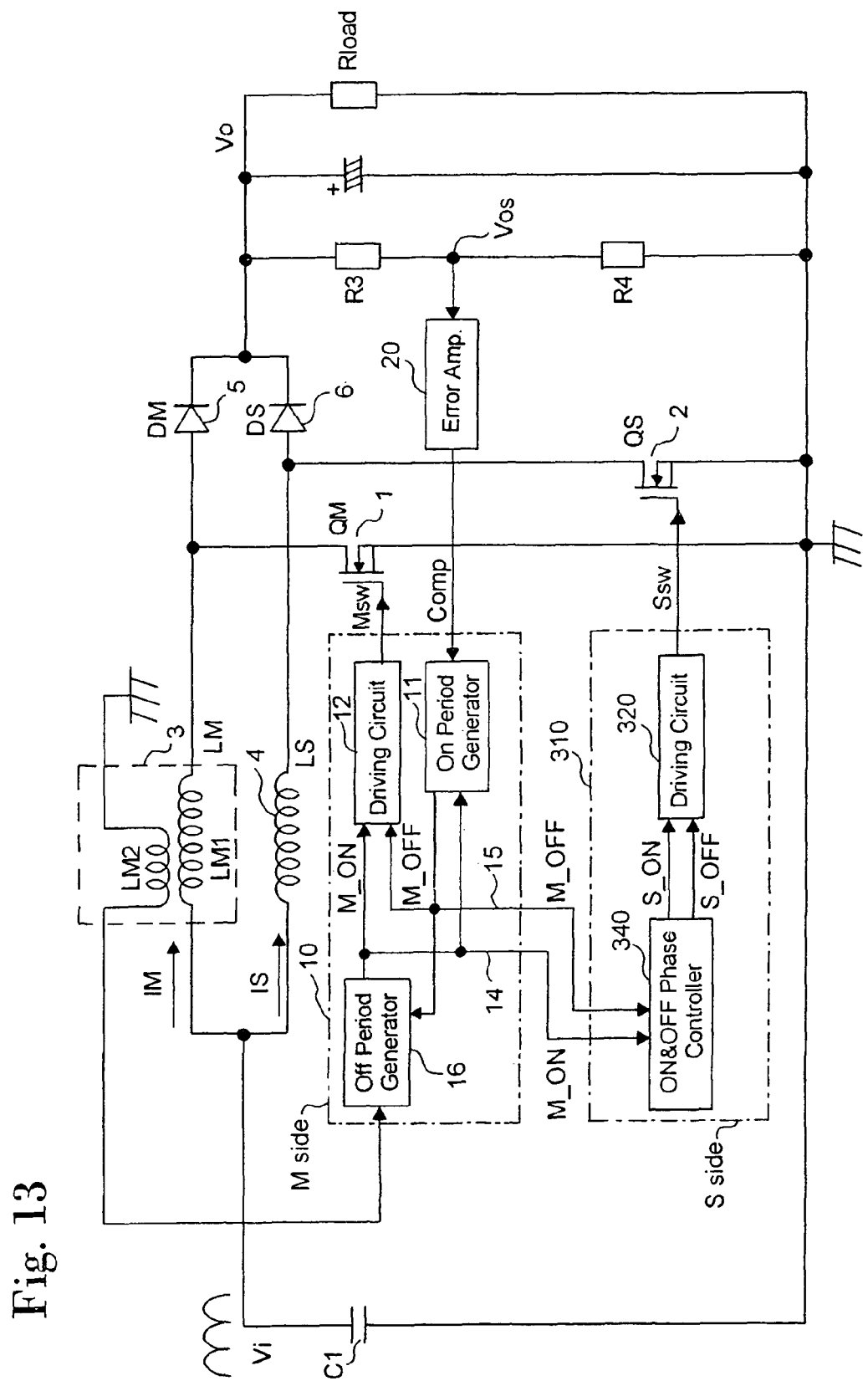
FIG. 13 is a diagram showing a circuit configuration in which a master-side off period generator outputs a turn-on signal by using auxiliary winding, as a modification of the second embodiment shown in FIG. 6.

FIG. 13 is a diagram showing a circuit configuration in which a master-side off period generator outputs a turn-on signal by auxiliary winding, as a modification of the second embodiment shown in FIG. 6. That is, in FIG. 13, an inductor LM (3) is made of a combination of a main winding LM1 and an auxiliary winding LM2 so that a current flowing in the inductor LM (3) of the master-side converter can be detected. A master-side off period generator 16 detects the time that the current flowing in the inductor LM (3) of the master-side converter becomes zero, through the auxiliary winding LM2 and generates a turn-on signal M_ON 14. That is, the master-side off period generator 16 detects the time that the inductor current IM flowing in the main winding LM1 becomes zero, through the auxiliary winding LM2 coupled magnetically, generates a turn-on signal M_ON 14, and outputs the signal as a timing signal for turning on the switching element QM (1) of the master-side converter. Because the configuration except the above is the same as the configuration of the second embodiment shown in FIG. 6, description thereof will be omitted.

Embodiment 3

Figure 10:
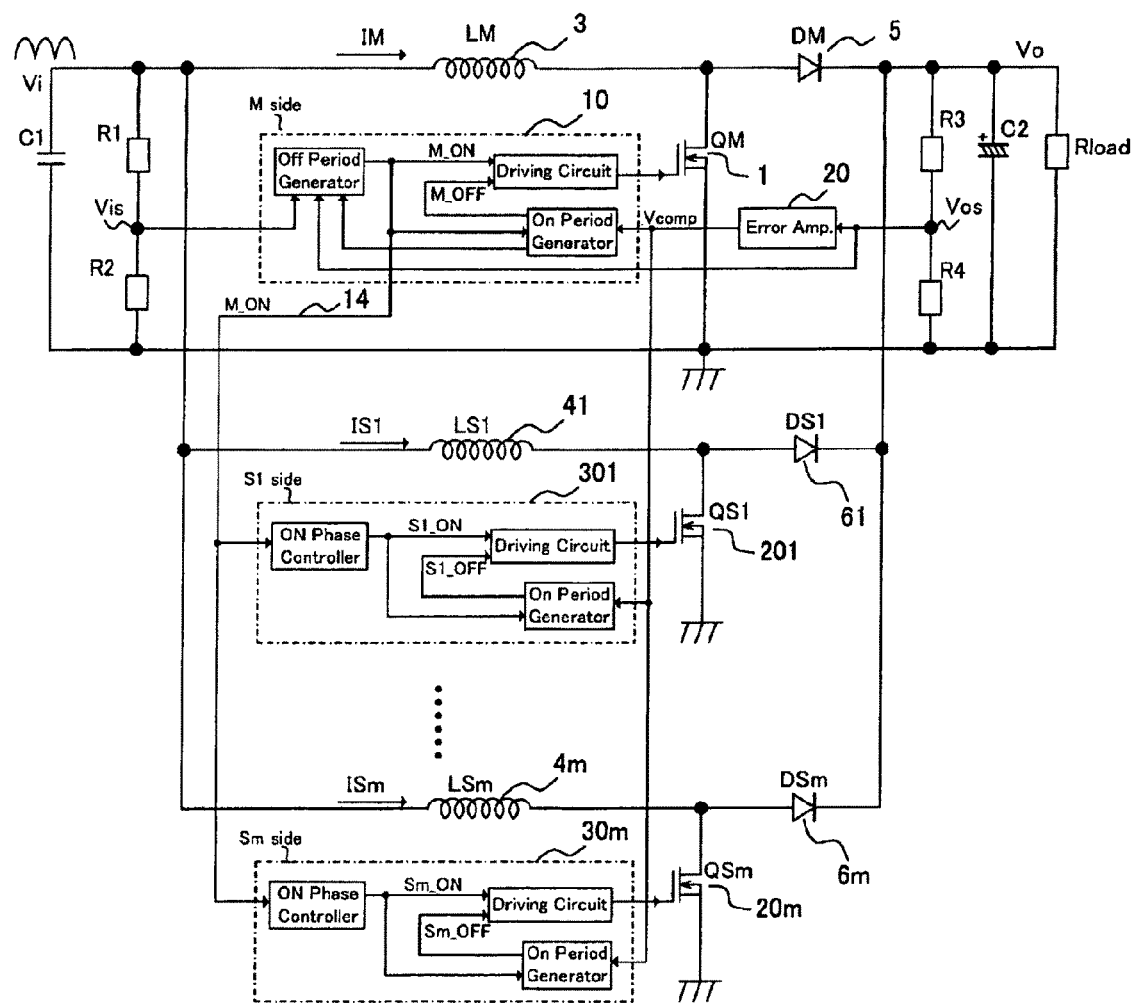
FIG. 10 is a diagram showing a first example of a circuit configuration of a multi-phased critical interleaved PFC boost converter.

FIG. 10 is a diagram showing a first example of circuit configuration of a multi-phased critical interleaved PFC boost converter. FIG. 10 shows a circuit configuration obtained by increasing the number of phases in the circuit configuration of the critical interleaved PFC boost converter shown in FIG. 1 to three or more. In FIG. 10, a plurality of slave-side control circuits 301, . . . , 30m (m is an integer of 2 or more) are provided for one master-side control circuit 10. The configuration of each of the slave-side control circuits 301, . . . , 30m is the same as that of the slave-side control circuit 30 shown in FIG. 1 and detailed description thereof will be omitted here.

Figure 11:
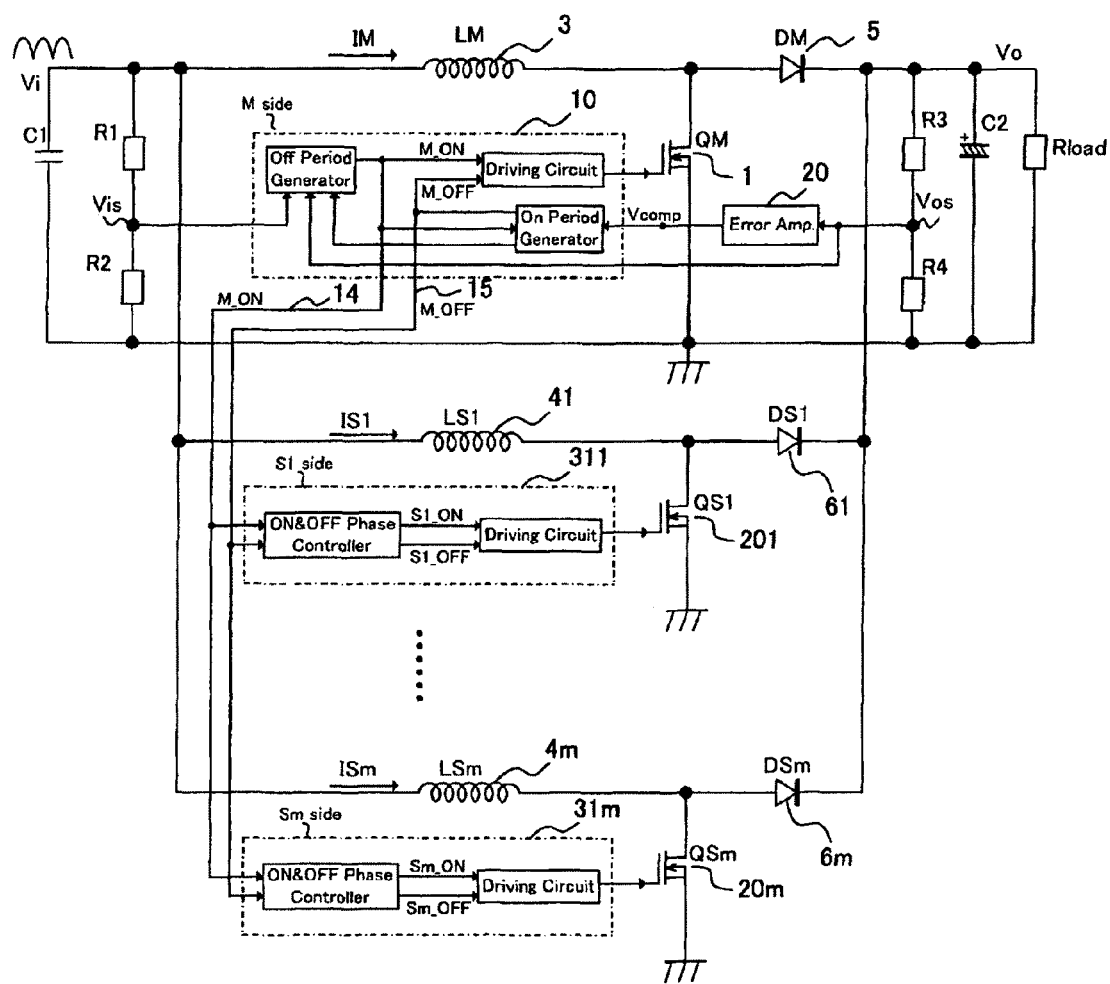
FIG. 11 is a diagram showing a second example of a circuit configuration of the multi-phased critical interleaved PFC boost converter.

FIG. 11 is a diagram showing a second example of circuit configuration of the multi-phased critical interleaved PFC boost converter. FIG. 11 shows a circuit configuration obtained by increasing the number of phases in the circuit configuration of the critical interleaved PFC boost converter shown in FIG. 6 to three or more. In FIG. 11, a plurality of slave-side control circuits 311, . . . , 31m (m is an integer of 2 or more) are provided for one master-side control circuit 10. The configuration of each of the slave-side control circuits 311, . . . , 31m is the same as that of the slave-side control circuit 310 shown in FIG. 6 and detailed description thereof will be omitted here.

In the circuit configuration of each of the multi-phased critical interleaved PFC boost converters shown in FIGS. 10 and 11, the k-phase order slave-side control circuit is controlled so that the relation between the discharging current Id_k of the k-phase order capacitor and the charging current Ic satisfies the equation (8). Incidentally, when the multi-phased critical interleaved PFC boost converter is an N-phase critical interleaved PFC boost converter, k is an integer of 1 to (N−1) in which N is an integer of 3 or larger.

As described above, in accordance with the invention, there can be provided a power factor-improved power supply device in which a critical interleave control technique is achieved by a simple circuit configuration to attain high phase control accuracy and thereby a high power factor.

Although the above description has been made in the case where a technique of calculating the master-side critical point, that is, the time point that the current of the master-side inductor LM becomes zero, by an arithmetic operation is taken as an example, the invention is not limited thereto. An element for detecting the inductor current may be provided in a circuit so that the critical point can be measured based on a result of the detection without any arithmetic operation. For example, a configuration in which a voltage between the opposite ends of a current detection resistor connected in series to the master-side inductor LM is detected may be used. For example, a configuration in which a current transformer is used or the master-side inductor LM is provided as a transformer structure so that the current of the master-side inductor LM is measured based on the secondary output of the transformer may be used.

Figure 14:
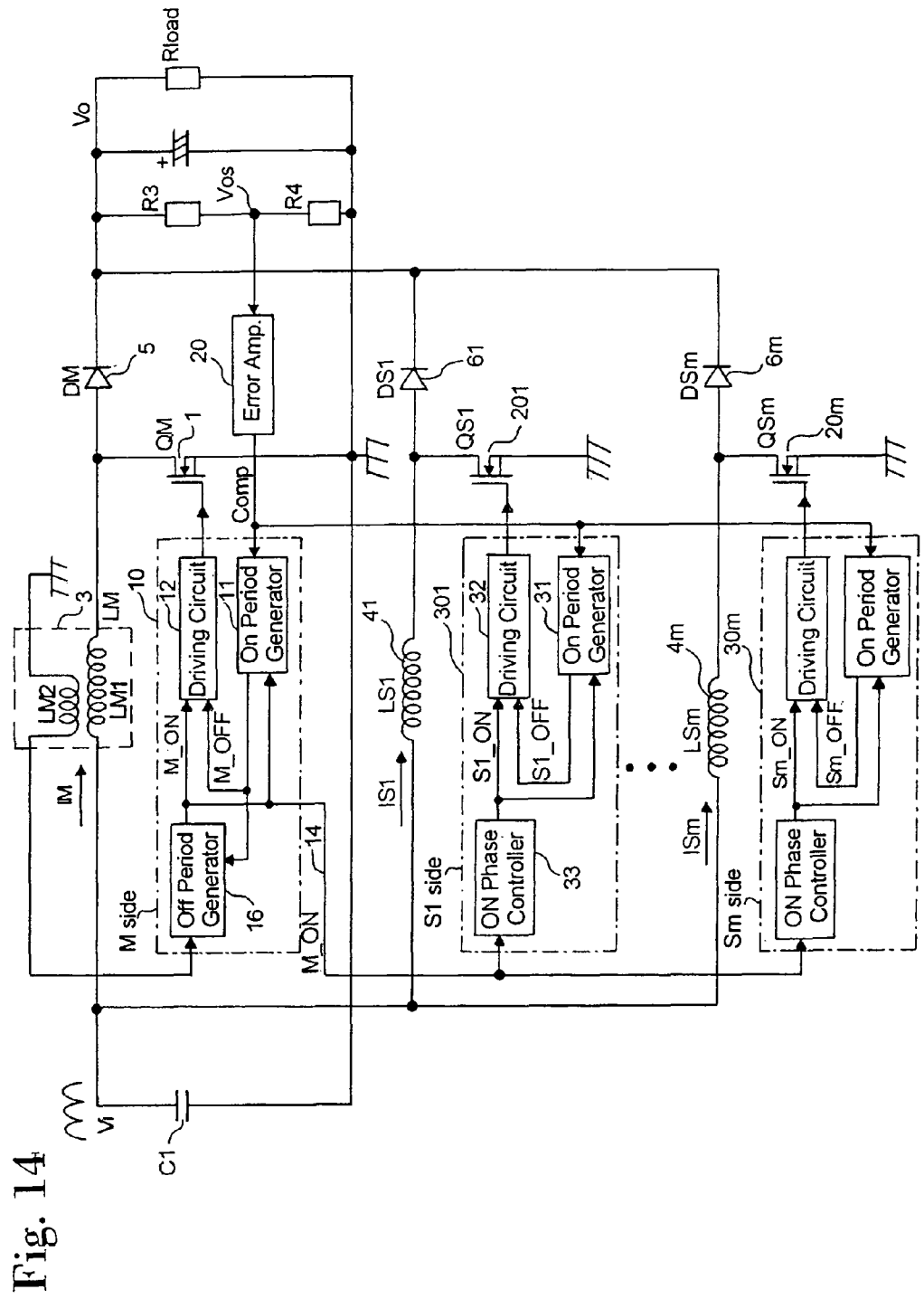
FIG. 14 is a diagram showing a circuit configuration in which a master-side off period generator outputs a turn-on signal by using auxiliary winding, as a modification of the first example of the multi-phased interleaved PFC boost converter shown in FIG. 10.

FIG. 14 is a diagram showing a circuit configuration in which a master-side off period generator outputs a turn-on signal by using auxiliary winding, as a modification of the first example of the multi-phased interleaved PFC boost converter shown in FIG. 10. That is, in FIG. 14, an inductor LM (3) is made of a combination of a main winding LM1 and an auxiliary winding LM2 so that a current flowing in the inductor LM (3) of the master-side converter can be detected. A master-side off period generator 16 detects the time that the current flowing in the inductor LM (3) of the master-side converter becomes zero, through the auxiliary winding LM2 and generates a turn-on signal M_ON 14. That is, the master-side off period generator 16 detects the time that the inductor current IM flowing in the main winding LM1 becomes zero, through the auxiliary winding LM2 coupled magnetically, generates a turn-on signal M_ON 14, and outputs the signal as a timing signal for turning on the switching element QM (1) of the master-side converter. Because the configuration except the above is the same as the configuration of the first example of the multi-phased interleaved PFC boost converter shown in FIG. 10, description thereof will be omitted.

Figure 15:
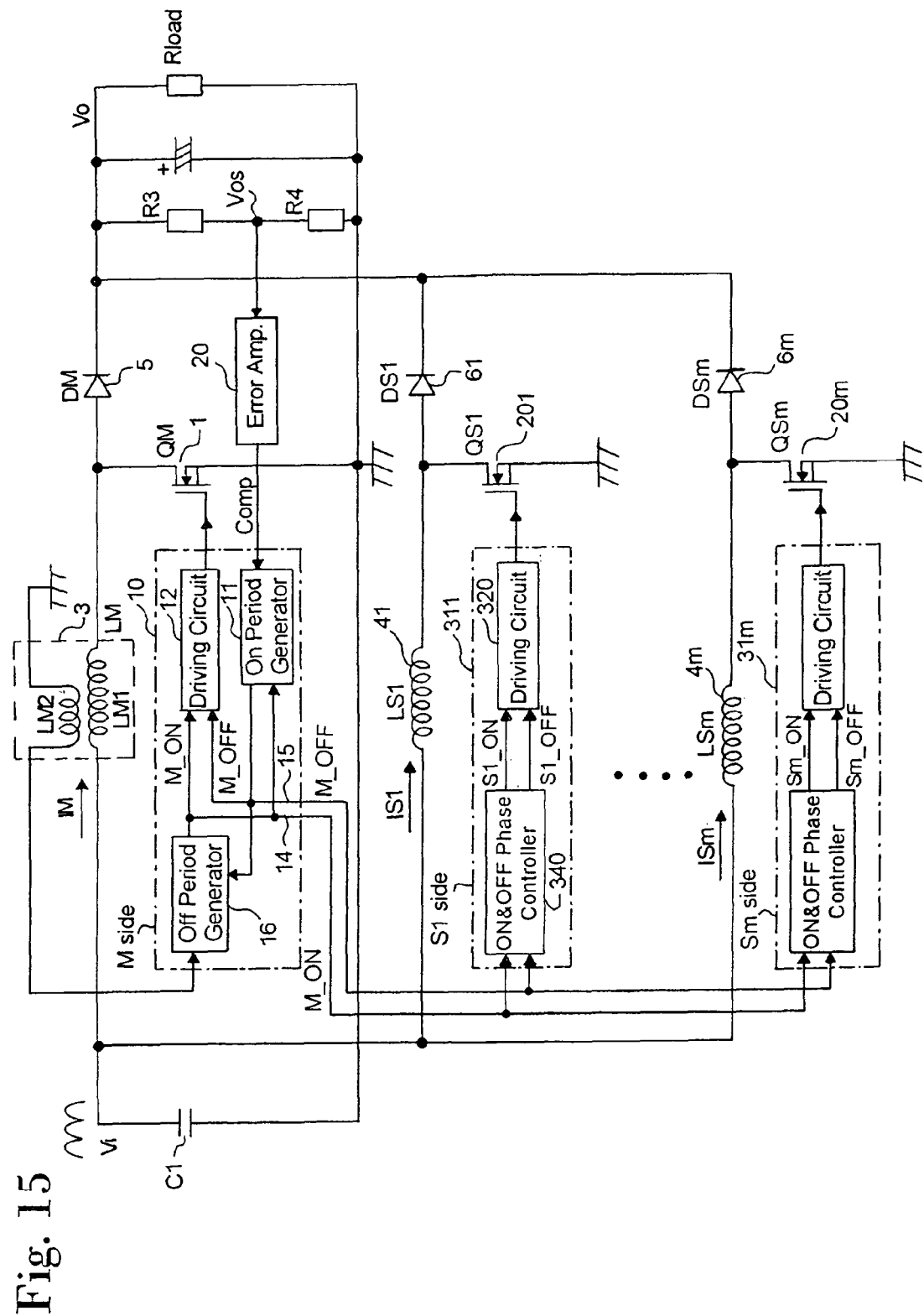
FIG. 15 is a diagram showing a circuit configuration in which a master-side off period generator outputs a turn-on signal by using auxiliary winding, as a modification of the second example of the multi-phased interleaved PFC boost converter shown in FIG. 11.

FIG. 15 is a diagram showing a circuit configuration in which a master-side off period generator outputs a turn-on signal by using auxiliary winding, as a modification of the second example of the multi-phased interleaved PFC boost converter shown in FIG. 11. That is, in FIG. 15, an inductor LM (3) is made of a combination of a main winding LM1 and an auxiliary winding LM2 so that a current flowing in the inductor LM (3) of the master-side converter can be detected. A master-side off period generator 16 detects the time that the current flowing in the inductor LM (3) of the master-side converter becomes zero, through the auxiliary winding LM2 and generates a turn-on signal M_ON 14. That is, the master-side off period generator 16 detects the time that the inductor current IM flowing in the main winding LM1 becomes zero, through the auxiliary winding LM2 coupled magnetically, generates a turn-on signal M_ON 14, and outputs the signal as a timing signal for turning on the switching element QM (1) of the master-side converter. Because the configuration except the above is the same as the configuration of the second example of the multi-phased interleaved PFC boost converter shown in FIG. 11, description thereof will be omitted.

Embodiment 4

Figure 16:
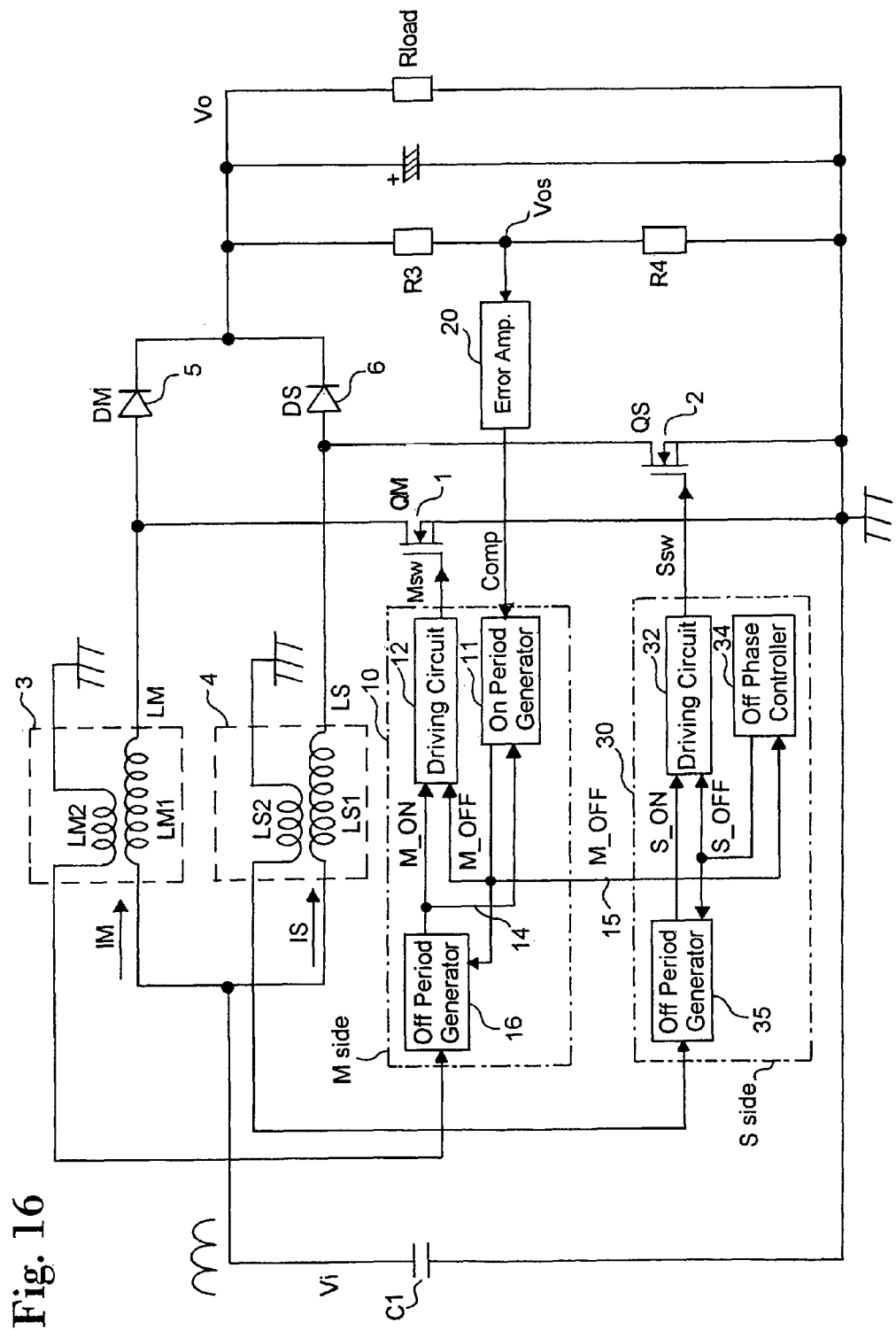
FIG. 16 is a diagram showing a circuit configuration of a two-phase critical interleaved PFC boost converter according to a fourth embodiment of the invention.

FIG. 16 is a diagram showing a circuit configuration of a two-phase critical interleaved PFC (Power Factor Correction) boost converter according to a fourth embodiment of the invention. The configuration and operation of the master side are the same as those in FIG. 12, and the description thereof will be omitted. In the two-phase critical interleaved PFC boost converter according to the fourth embodiment shown in FIG. 16, an inductor LS (4) is made of a combination of a main winding LS1 and an auxiliary winding LS2 so that a current flowing in the inductor LS (4) of the slave-side converter can be detected. A slave-side off period generator 35 detects the time that the current flowing in the main winding LS1 of the inductor LS (4) of the slave-side converter becomes zero, through the auxiliary winding LS2 coupled magnetically and generates a turn-on signal S_ON. On the other hand, a master-side on period generator 11 generates a turn-off signal M_OFF 15. The turn-off signal M_OFF 15 is input to a slave-side off phase controller 34. The slave-side off phase controller 34 generates a turn-off signal S_OFF based on the turn-off signal M_OFF 15 and outputs the turn-off signal S_OFF to the slave-side off period generator 35. In this manner, the falling timing of the slave signal S can be delayed for half a period from the falling timing of the master signal M. The rising timing of the slave signal S is determined by the slave-side off period generator 35 in the same manner as on the master side. Incidentally, the configuration and operation of each circuit on the slave side are the same as those described above, and description thereof will be omitted.

Repeating the description related to FIGS. 1 to 4 here, the turn-on signal M_ON 14 output from the master-side off period generator 16 turns on the switching element QM (1) to determine the end timing of the off period Toff of the switching element QM (1) (the end of Toff is equal to the start of Ton) to thereby determine the off period Toff of the switching element QM (1). The turn-off signal M_OFF 15 output from the master-side on period generator 11 turns off the switching element QM (1) to determine the end timing of the on period Ton of the switching element QM (1) (the end of Ton is equal to the start of Toff) to thereby determine the on period Ton of the switching element QM (1). The S_ON signal output from the slave-side off period generator 35 turns on the switching element QS (2) to determine the end timing of the off period Toff of the switching element QS (2) (the end of Toff is equal to the start of Ton) to thereby determine the off period Toff. The S_OFF signal output from the slave-side off phase controller 34 turns off the switching element QS (2) to determine the end timing of the on period Ton of the switching element QS (2) (the end of Ton is equal to the start of Toff) to thereby determine the on period Ton. Incidentally, the switching cycle of the master signal (which is equal to the switching cycle of the M_ON signal (14)) is equal to (Ton+Toff) of the switching element QM (1). The master-side driving circuit 12 generates a master signal Msw based on the M_OFF signal and the M_ON signal input to the master-side driving circuit 12 and feeds the master signal Msw to the gate of the switching element QM (1) to thereby critically control the switching element QM (1). Similarly, the switching cycle of the slave signal S (which is equal to the switching cycle of the S_ON signal) is equal to (Ton+Toff) of the switching element QS (2). This switching cycle of the slave signal S is substantially equal to the switching cycle of the master signal M (if there is a slight difference, the difference can be cancelled by repetition of the cycle). The slave-side driving circuit 32 generates a slave signal Ssw based on the S_ON signal and the S_OFF signal input to the slave-side driving circuit 32 and feeds the slave signal Ssw to the gate of the switching element QS (2) to thereby critically control the switching element QS (2).

Figure 17:
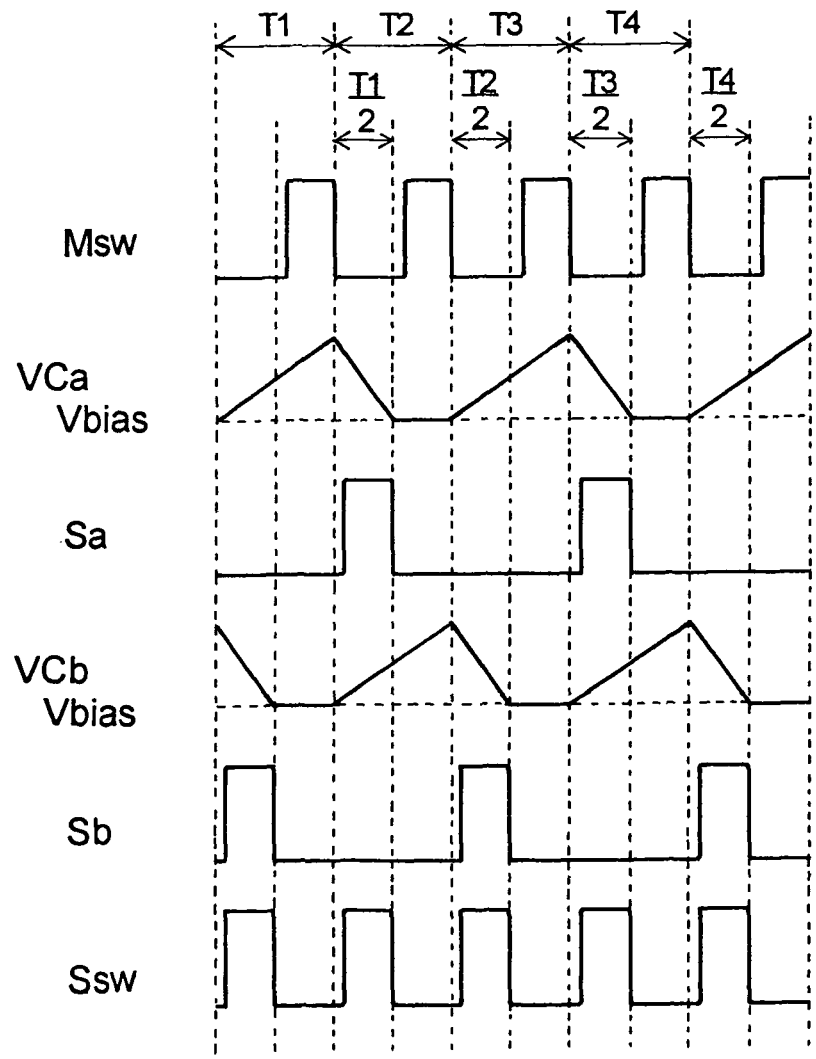
FIG. 17 is a time chart for explaining the operation of the two-phase critical interleaved PFC boost converter shown in FIG. 16.

FIG. 17 is a time chart for explaining the operation of the two-phase critical interleaved PFC boost converter shown in FIG. 16 and for explaining a mechanism of determining the falling timing of the slave signal S based on the falling timing of the master signal M.

(1) In a period T1, a capacitor Ca is charged with an initial value of a bias voltage Vbias at a charging current Ic, so that the voltage VCa between the opposite ends of the capacitor Ca increases linearly up to the end of the period T1. The final voltage VCa between the opposite ends of the capacitor Ca gives cycle information of the master signal Msw.

(2) At the rising timing in a period T2, the capacitor Ca begins to be discharged at a discharging current Id twice as high as the charging current Ic. The timing that the voltage VCa between the opposite ends of the capacitor Ca returns to the bias voltage Vbias becomes equal to falling timing of a slave-side signal Sa. In this manner, in the period T2, the slave-side signal Sa is delayed for a half of the period T1 from the master signal Msw. In the period T2, the cycle of critical PFC is changed but the difference between the adjacent periods is very small (T1≈T2) so that the phase difference between the master signal Msw and the slave-side signal Sa can be regarded as about 180°.

(3) In the period T2, a capacitor Cb is charged with an initial value of the bias voltage Vbias at a charging current Ic, so that the voltage VCb between the opposite ends of the capacitor Cb increases linearly up to the end of the period T2. The final voltage VCb between the opposite ends of the capacitor Cb gives cycle information of the master signal Msw.

(4) At the rising timing in a period T3, the capacitor Cb begins to be discharged at a discharging current Id twice as high as the charging current Ic. The timing that the voltage VCb between the opposite ends of the capacitor Cb returns to the bias voltage Vbias becomes equal to the falling timing of a slave-side signal Sb. In this manner, in the period T3, the slave-side signal Sb is delayed for a half of the period T2 from the master signal Msw.

(5) When the slave-side signal Sa and the slave-side signal Sb are ORed, a slave signal Ssw interleaved with the master signal Msw can be obtained. Incidentally, the falling timing of the slave signal Ssw is determined by the off phase controller 34 of the slave-side control circuit 30 based on the turn-off signal M_OFF 15 which is generated by the on period generator 11 of the master-side control circuit 10 and which is input to the off phase controller 34.

Figure 18:
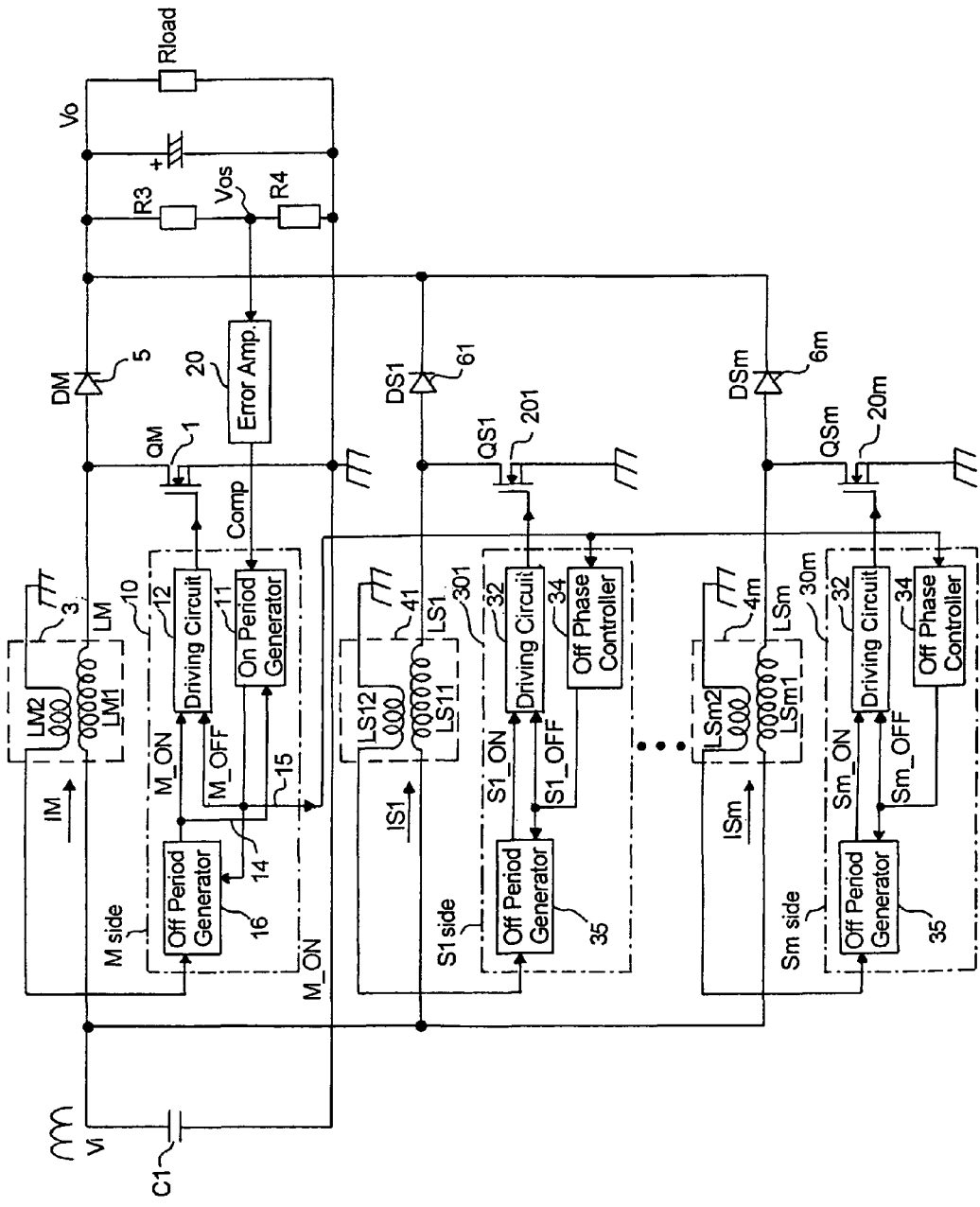
FIG. 18 is a diagram showing a circuit configuration of a critical interleaved PFC boost converter obtained by increasing the number of phases in the circuit configuration shown in FIG. 16.

FIG. 18 is a diagram showing a circuit configuration of a critical interleaved PFC boost converter obtained by increasing the number of phases in the circuit configuration shown in FIG. 16. In FIG. 18, a plurality of slave-side control circuits 301, . . . , 30*m* (m is an integer of 2 or larger) are provided for one master-side control circuit 10. The configuration of each of the slave-side control circuits 301, . . . , 30*m* is the same as the configuration of the slave-side control circuit 30 shown in FIG. 16, except that the M_OFF signal generated by the on phase controller 11 of the master-side control circuit 10 is input to each slave-side off phase controller 34. Incidentally, the ratio of the value of the discharging current to the value of the charging current in each of first to fourth capacitors Ca_ON, Ca_OFF, Cb_ON and Cb_OFF in each of the slave-side control circuits is set according to the equation (8).

With respect to the aforementioned embodiments, the bias voltage "Vbias" may be provided as a high voltage while discharging and charging in the respective phase controllers are replaced by each other (cycle information is obtained based on discharging of each capacitor with an initial value of the bias voltage "Vbias"). Because it is easy to achieve these based on the above description, no specific configuration example will be described. Incidentally, in this case, the relation between the discharging current and the charging current in each capacitor is determined to satisfy the following equations (9) and (10) instead of the equations (7) and (8) respectively.

$$Ic = 2 \cdot Id \quad (9)$$

$$Ic\_k = (N/k) \cdot Id \quad (10)$$

in which Id is the value of the discharging current common to all phases, and Ic_k is the value of the charging current in the k-phase order capacitor.

It is further preferable that the inductance value of the master-side inductor LM and the inductance value of the slave-side inductor LS are substantially equal to each other.

Although examples of circuit configuration of a two-phase or multi-phase (three phases or more) critical interleaved PFC boost converter have been entirely described in the embodiments, the invention is not limited to the critical interleaved PFC boost converter but can be applied to other converters such as a buck-boost converter, a buck converter, etc. intended to achieve interleaved PFC.

The disclosures of Japanese Patent Applications No. 2008-267600 filed on Oct. 16, 2008 and No. 2009-138578 filed on Jun. 9, 2009 are incorporated herein by reference in their entirety.

While the invention has been explained with reference to the specific embodiments of the invention, the explanation is illustrative and the invention is limited only by the appended claims.

What is claimed is:

1. An interleave control power supply device comprising a master converter with a switching element, and a slave converter with a switching element, the switching elements of the master converter and the slave converter being operated with a predetermined phase difference, wherein
   the master converter has a master-side control circuit for controlling the switching element of the master converter;
   the master-side control circuit generates a master signal for controlling an on/off state of the switching element of the master converter, and controls the switching element at an on/off timing of the master signal;
   the slave converter has a slave-side control circuit for controlling the switching element of the slave converter; and
   the slave-side control circuit includes any one of:
   (a) an on phase controller which receives the on timing of the master signal, generates an on timing signal of the slave signal with a predetermined phase difference from the master signal based on the on timing of the master signal and outputs the on timing signal of the slave signal as a timing signal for turning on the switching element of the slave converter, and a slave-side on period generator which generates an on period of the switching element of the slave converter;
   (b) the on phase controller, and an off phase controller which receives the off timing of the master signal, generates an off timing signal of the slave signal with a predetermined phase difference from the master signal based on the off timing of the master signal and outputs the off timing signal as a timing signal for turning off the switching element of the slave converter; and (c) the off phase controller, and a slave-side off period generator which generates an off period of the switching element of the slave converter, wherein the master-side control circuit includes:

a master-side on period generator which generates an on period of the switching element of the master converter by multiplying a difference between an error signal output from an error amplifier and a reference voltage by a constant coefficient or generates an on period with a fixed width; and a master-side off period generator which generates an off period of the switching element of the master converter by applying an arithmetic operation of off period=input voltage×on period/(output voltage−input voltage) based on an input voltage, an output voltage and the on period generated by the master-side on period generator, and outputs a timing signal for turning on the switching element of the master converter based on the off period or by detecting a current flowing in an inductor of the master converter and detecting a time that the current flowing in the inductor of the master converter becomes zero, and wherein the slave-side control circuit includes:

the slave-side on period generator which generates an on period of the switching element of the slave converter by multiplying a difference between the error signal output from the error amplifier and a reference voltage by a constant coefficient, or generates an on period with a fixed width; and the slave-side off period generator which generates an off period of the switching element of the slave converter;

(i) the slave-side off period generator generates the off period of the switching element of the slave converter by an arithmetic operation of input voltage×on period/(output voltage−input voltage) based on the input voltage, the output voltage and the on period generated by the master-side on period generator or the slave-side on period generator, and outputs a timing signal for turning on the switching element of the slave converter based on the off period; or (ii) the slave-side off period generator detects a current flowing in an inductor of the slave converter to detect the time that the current flowing in the inductor of the slave converter becomes zero, and outputs a timing signal for turning on the switching element of the slave converter.

2. The interleave control power supply device according to claim 1, wherein the on phase controller includes:

a master signal cycle information generating circuit which has a first capacitor and which charges or discharges the first capacitor during one period of the master signal;

a first timing determination circuit which determines a first timing of the slave signal based on completion of discharging or charging of the first capacitor; and a second timing determination circuit which has a second capacitor and which determines a second timing of the slave signal based on discharging or charging of the second capacitor during charging or discharging of the first capacitor by the master signal cycle information generating circuit by making the second capacitor perform same operation as the first capacitor while shifting one period from the master signal period used for charging the first capacitor by the master signal cycle information generating circuit.

3. The interleave control power supply device according to claim 2, wherein the on phase controller further comprises a slave signal generating circuit which generates the on timing signal of the slave signal by ORing the first timing determined by the first timing determination circuit and the second timing determined by the second timing determination circuit.

4. The interleave control power supply device according to claim 2, wherein the master signal cycle information generating circuit has a capacitor charging circuit which generates cycle information on the master signal by charging the first capacitor at a predetermined charging current with a predetermined constant voltage as an initial value during one period of the master signal, the capacitor charging circuit has a first constant current source which controls the predetermined charging current, and a first switch circuit which puts the first constant current source in a charging path of the first capacitor, the first timing determination circuit has a capacitor discharging circuit which determines a first timing signal by discharging the first capacitor at a predetermined discharging current from a charged voltage charged during one period of the master signal to the predetermined constant voltage, and the capacitor discharging circuit has a second constant current source which controls the predetermined discharging current, and a second switch circuit which puts the second constant current source in a discharging path of the first capacitor.

5. The interleave control power supply device according to claim 2, wherein the master signal cycle information generating circuit has a capacitor discharging circuit which generates cycle information on the master signal by discharging the first capacitor at a predetermined discharging current with a predetermined constant voltage as an initial value during one period of the master signal, the capacitor discharging circuit has a constant current source which controls the predetermined discharging current, and a first switch circuit which puts the constant current source in a discharging path of the first capacitor, the first timing determination circuit has a capacitor charging circuit which determines the first timing signal by charging the first capacitor at a predetermined charging current from the discharged voltage discharged during one period of the master signal to the predetermined constant voltage, and the capacitor charging circuit has a constant current source which controls the predetermined charging current, and a second switch circuit which puts the constant current source in a charging path of the first capacitor.

6. The interleave control power supply device according to claim 2, wherein a ratio of a value of a discharging current to a value of a charging current in each of the first and second capacitors is set at a predetermined value to generate a predetermined phase difference.

7. The interleave control power supply device according to claim 1, wherein the off phase controller includes:

a master signal cycle information generating circuit which has a first capacitor and which charges or discharges the first capacitor during one period of the master signal;

a first timing determination circuit which determines a first timing of the slave signal based on completion of discharging or charging of the first capacitor; and a second timing determination circuit which has a second capacitor and which determines a second timing of the slave signal based on discharging or charging of the second capacitor during charging or discharging of the first capacitor by the master signal cycle information generating circuit by making the second capacitor perform the same operation as the first capacitor while shifting one period from the master signal period used for charging the first capacitor by the master signal cycle information generating circuit.

8. The interleave control power supply device according to claim 7, wherein the off phase controller further comprises a slave signal generating circuit which generates an off timing signal of the slave signal by ORing the first timing determined by the first timing determination circuit and the second timing determined by the second timing determination circuit.

9. The interleave control power supply device according to claim 7, wherein the master signal cycle information generating circuit has a capacitor charging circuit which generates cycle information on the master signal by charging the first capacitor at a predetermined charging current with a predetermined constant voltage as an initial value during one period of the master signal, the capacitor charging circuit has a first constant current source which controls the predetermined charging current, and a first switch circuit which puts the first constant current source in a charging path of the first capacitor, the first timing determination circuit has a capacitor discharging circuit which determines a first timing signal by discharging the first capacitor at a predetermined discharging current from a charged voltage charged during one period of the master signal to the predetermined constant voltage, and the capacitor discharging circuit has a second constant current source which controls the predetermined discharging current, and a second switch circuit which puts the second constant current source in a discharging path of the first capacitor.

10. The interleave control power supply device according to claim 7, wherein the master signal cycle information generating circuit has a capacitor discharging circuit which generates cycle information on the master signal by discharging the first capacitor at a predetermined discharging current with a predetermined constant voltage as an initial value during one period of the master signal, the capacitor discharging circuit has a first constant current source which controls the predetermined discharging current, and a first switch circuit which puts the first constant current source in a discharging path of the first capacitor, the first timing determination circuit has a capacitor charging circuit which determines a first timing signal by charging the first capacitor at a predetermined charging current from a discharged voltage discharged during one period of the master signal to the predetermined constant voltage, and the capacitor charging circuit has a second constant current source which controls the predetermined charging current, and a second switch circuit which puts the second constant current source in a charging path of the first capacitor.

11. The interleave control power supply device according to claim 1, wherein each of the on phase controller and the off phase controller includes:

a master signal cycle information generating circuit which has a first capacitor and which charges or discharges the first capacitor during one period of the master signal;

a first timing determination circuit which determines a first timing of the slave signal based on completion of discharging or charging of the first capacitor; and a second timing determination circuit which has a second capacitor and which determines a second timing of the slave signal based on discharging or charging of the second capacitor during charging or discharging of the first capacitor by making the second capacitor perform same operation as the first capacitor while shifting one period from the master signal period used for charging or discharging of the first capacitor by the master signal cycle information generating circuit;

the slave-side control circuit further has a first logic circuit which generates a first on/off signal from the first timing determined by the on phase controller and the first timing determined by the off phase controller, a second logic circuit which generates a second on/off signal from the second timing determined by the on phase controller and the second timing determined by the off phase controller, and a third logic circuit which generates the slave signal by combining the first on/off signal and the second on/off signal; or the slave-side control circuit further has a fourth logic circuit which generates an on timing signal of the slave signal from the first timing determined by the on phase controller and the second timing determined by the second timing determination circuit, a fifth logic circuit which generates an off timing signal of the slave signal from the first timing determined by the on phase controller and the second timing determined by the second timing determination circuit, and a sixth logic circuit which generates the slave signal by combining the on timing signal of the slave signal and the off timing signal of the slave signal.

12. The interleave control power supply device according to claim 11, wherein the master signal cycle information generating circuit has a capacitor charging circuit which generates cycle information on the master signal by charging the first capacitor at a predetermined charging current with a predetermined constant voltage as an initial value during one period of the master signal;

the capacitor charging circuit has a first constant current source which controls the predetermined charging current, and a first switch circuit which puts the first constant current source in a charging path of the first capacitor;

the first timing determination circuit has a capacitor discharging circuit which determines the first timing signal by discharging the first capacitor at a predetermined discharging current from a charged voltage charged during one period of the master signal to the predetermined constant voltage; and the capacitor discharging circuit has a second constant current source which controls the predetermined discharging current, and a second switch circuit which puts the second constant current source in a discharging path of the first capacitor.

13. The interleave control power supply device according to claim 11, wherein the master signal cycle information generating circuit has a capacitor discharging circuit which generates cycle information on the master signal by discharging the first capacitor at a predetermined discharging current with a predetermined constant voltage as an initial value during one period of the master signal, the capacitor discharging circuit has a first constant current source which controls the predetermined discharging current, and a first switch circuit which puts the first constant current source in a discharging path of the first capacitor, the first timing determination circuit has a capacitor charging circuit which determines the first timing signal by charging the first capacitor at a predetermined charging current from a discharged voltage discharged during one period of the master signal to the predetermined constant voltage, and the capacitor charging circuit has a second constant current source which controls the predetermined charging current, and a second switch circuit which puts the second constant current source in a charging path of the first capacitor.

14. The interleave control power supply device according to claim 11, wherein a ratio of a value of a discharging current to a value of a charging current in each of the first and second capacitors is set at a predetermined value to generate a predetermined phase difference.

15. A multi-phase interleave control power supply device, comprising:

a master converter with a switching element, and a slave converter with a switching element, the switching elements of the master converter and the slave converter being operated with a predetermined phase difference, wherein the master converter has a master-side control circuit for controlling the switching element of the master converter;

the master-side control circuit generates a master signal for controlling an on/off state of the switching element of the master converter, and controls the switching element at an on/off timing of the master signal;

the slave converter has a slave-side control circuit for controlling the switching element of the slave converter; and the slave-side control circuit includes any one of:

(a) an on phase controller which receives the on timing of the master signal, generates an on timing signal of the slave signal with a predetermined phase difference from the master signal based on the on timing of the master signal and outputs the on timing signal of the slave signal as a timing signal for turning on the switching element of the slave converter, and a slave-side on period generator which generates an on period of the switching element of the slave converter;

(b) the on phase controller, and an off phase controller which receives the off timing of the master signal, generates an off timing signal of the slave signal with a predetermined phase difference from the master signal based on the off timing of the master signal and outputs the off timing signal as a timing signal for turning off the switching element of the slave converter; and (c) the off phase controller, and a slave-side off period generator which generates an off period of the switching element of the slave converter, wherein the multi-phase interleave control power supply device comprises the master-side control circuit; and N−1 of the slave-side control circuit, wherein when the first capacitor is charged during one period of the master signal in the slave-side control circuit which is in k-phase order, the following equation is satisfied:

$$Id\_k = (N/k) \cdot Ic$$

in which k is an integer of 1 to (N−1), N is an integer of 3 or larger, Id_k is a discharging current of a k-phase order capacitor, and Ic is a charging current; and when the first capacitor is discharged during one period of the master signal, the following equation is satisfied:

$$Ic\_k = (N/k) \cdot Id$$

in which Id is a discharging current of the k-phase order capacitor, and Ic_k is a charging current.

16. A control circuit of an interleave control power supply device comprising:

a master converter with a switching element, a slave converter with a switching element, the switching elements of the master converter and the slave converter operating with a predetermined phase difference, a master-side control circuit which generates a master signal for controlling an on/off state of the switching element of the master converter and controls the switching element at an on/off timing of the master signal; and a slave-side control circuit which controls the switching element of the slave converter, wherein the slave-side control circuit includes any one of:

(a) an on phase controller which receives the on timing of the master signal, generates an on timing signal of the slave signal with a predetermined phase difference from the master signal based on the on timing of the master signal and outputs the on timing signal of the slave signal as a timing signal for turning on the switching element of the slave converter, and a slave-side on period generator which generates an on period of the switching element of the slave converter;

(b) the on phase controller, and an off phase controller which receives the off timing of the master signal, generates an off timing signal of the slave signal with a predetermined phase difference from the master signal based on the off timing of the master signal and outputs the off timing signal as a timing signal for turning off the switching element of the slave converter; and (c) the off phase controller, and a slave-side off period generator which generates an off period of the switching element of the slave converter, wherein the master-side control circuit includes:

a master-side on period generator which generates an on period of the switching element of the master converter by multiplying a difference between an error signal output from an error amplifier and a reference voltage by a constant coefficient or generates an on period with a fixed width; and a master-side off period generator which generates an off period of the switching element of the master converter (a) by applying an arithmetic operation of off period=input voltage×on period/(output voltage−input voltage) based on an input voltage, an output voltage and the on period generated by the master-side on period generator, and outputs a timing signal for turning on the switching element of the master converter based on the off period, or (b) by detecting a current flowing in an inductor of the master converter, or by detecting a time that the current flowing in the inductor of the master converter becomes zero, and wherein the slave-side control circuit includes:

the slave-side on period generator which generates an on period of the switching element of the slave converter by multiplying a difference between the error signal output from the error amplifier and a reference voltage by a constant coefficient or generates an on period with a fixed width; and the slave-side off period generator which generates an off period of the switching element of the slave converter, and (i) the slave-side off period generator generates an off period of the switching element of the slave converter by an arithmetic operation of input voltage×on period/(output voltage−input voltage) based on the input voltage, the output voltage and the on period generated by the master-side on period generator or the slave-side on period generator, and outputs a timing signal for turning on the switching element of the slave converter based on the off period, or (ii) the slave-side off period generator detects a current flowing in an inductor of the slave converter to thereby detect the time that the current flowing in the inductor of the slave converter becomes zero, and outputs a timing signal for turning on the switching element of the slave converter.

17. The control circuit of an interleave control power supply device according to claim 16, wherein the on phase controller includes:

a master signal cycle information generating circuit which has a first capacitor and which charges or discharges the first capacitor during one period of the master signal;

a first timing determination circuit which determines a first timing of the slave signal based on completion of discharging or charging of the first capacitor; and a second timing determination circuit which has a second capacitor and which determines a second timing of the slave signal based on discharging or charging of the second capacitor during charging or discharging of the first capacitor by the master signal cycle information generating circuit by making the second capacitor perform the same operation as the first capacitor while shifting one period from the master signal period used for charging the first capacitor by the master signal cycle information generating circuit.

* * * * *

UNITED STATES PATENT AND TRADEMARK OFFICE
CERTIFICATE OF CORRECTION

| | |
|---|---|
| PATENT NO. | : 8,482,948 B2 |
| APPLICATION NO. | : 12/588242 |
| DATED | : July 9, 2013 |
| INVENTOR(S) | : Jian Chen |

It is certified that error appears in the above-identified patent and that said Letters Patent is hereby corrected as shown below:

In the Specification

Please change column 12, line 2, "on phase controller" to --on phase controller 33--.

Signed and Sealed this
Twelfth Day of November, 2013

Teresa Stanek Rea
*Deputy Director of the United States Patent and Trademark Office*